United States Patent [19]

MacLaggan et al.

[11] Patent Number: 5,430,932
[45] Date of Patent: Jul. 11, 1995

[54] APPARATUS FOR INSTALLING A VALVE ON OR INTO AN EXISTING PIPE

[75] Inventors: Lawrence C. MacLaggan, Newcastle; Marcel J. Doucette, Miramichi, both of Canada

[73] Assignee: Insta Valve Co. Ltd, Canada

[21] Appl. No.: 213,265

[22] Filed: Mar. 15, 1994

[51] Int. Cl.⁶ .............................................. B23P 15/00
[52] U.S. Cl. .................................... 29/798; 29/213.1; 29/890.125; 29/890.126
[58] Field of Search ............. 29/890.125, 890.126, 29/890.132, 213.1, 252, 798; 137/317, 318

[56] References Cited

U.S. PATENT DOCUMENTS

| | | |
|---|---|---|
| 2,840,166 | 6/1958 | Eckel et al. . |
| 3,399,728 | 9/1968 | Taylor . |
| 3,532,113 | 10/1970 | McKean .............................. 29/213.1 |
| 3,647,174 | 3/1972 | LeRouax .............................. 251/1.3 |
| 3,717,202 | 2/1973 | Burrow . |
| 3,785,041 | 1/1974 | Smith . |
| 3,833,020 | 9/1974 | Smith . |
| 3,993,137 | 11/1976 | Hefetz . |
| 4,527,586 | 7/1985 | Yano et al. . |
| 4,552,170 | 11/1995 | Margrave . |
| 5,058,620 | 10/1991 | Jiles . |
| 5,076,311 | 12/1991 | Marschke . |
| 5,161,617 | 11/1992 | Marschke .............................. 166/298 |
| 5,228,178 | 7/1993 | Stickley .............................. 29/213.1 |

FOREIGN PATENT DOCUMENTS

| | | |
|---|---|---|
| 624457 | 7/1961 | Canada . |
| 677842 | 1/1964 | Canada . |
| 926319 | 5/1973 | Canada . |
| 922473 | 7/1976 | Canada . |
| 992887 | 7/1976 | Canada . |
| 1004211 | 1/1977 | Canada . |
| 2051862 | 3/1992 | Canada . |
| 2037597 | 9/1992 | Canada . |
| 2038553 | 9/1992 | Canada . |
| 2545191 | 4/1983 | France . |
| 2553862 | 10/1983 | France . |
| 2636965 | 8/1976 | Germany . |
| 2253022 | 6/1993 | United Kingdom . |
| 709903 | 7/1978 | U.S.S.R. . |

OTHER PUBLICATIONS

Team Environmental Services, Inc. (Marbo Division)—Line Stops.
Mueller Canada Inc.—Drilling Machines For Main Connectors.
Dialog Computer Print-Outs—"A & B"—Abstracts of Miscellaneous Patents.

Primary Examiner—Irene Cuda
Attorney, Agent, or Firm—Leonard Bloom

[57] ABSTRACT

An apparatus for installing and/or replacing a valve on an existing pipe which may be under fluid pressure. A first version of the apparatus includes a main housing having a pair of separable housing members together defining a first bore extending along a first axis for receiving the pipe and embracing the same. These housing members also define a second bore extending along a second axis intersecting the first axis in transverse relation thereto. An annular cutter disposed in said second bore is capable of being advanced along said second axis for cutting and removing a section of the pipe located within said main housing. A further member is axially movable with said cutter along said second bore into a predetermined axial position adjacent the ends of said pipe after said pipe section has been removed by said cutter. The further member has a port means extending transversely therethrough causing flow through said pipe to be selectively enabled and disabled when said further member is selectively moved or positioned such as to bring said port means into and out of alignment with said first axis along which the pipe extends. A sealing means is located within said main housing for forming a fluid tight seal between the pipe and each of said housing members when in use and also around said further member when it is in said axial position for enabling and disabling flow through said pipe.

32 Claims, 23 Drawing Sheets

APPARATUS FOR INSTALLING A VALVE ON OR INTO AN EXISTING PIPE

BACKGROUND OF THE INVENTION

This invention relates to an apparatus and a method for installing valves directly on or into an existing pipe. The pipe may be a new or an old installation; it may be empty or fluid filled under full pressure, and the pipe may consist of any suitable material.

Those persons knowledgeable with valve repair and replacement know the frustration of dealing with seized and leaking valves which cause equipment shutdowns and are very time consuming to replace. There is a need to provide a new type of valve which may be installed on existing pipes quickly, completely, and which does not require specialized equipment or training.

Today's valves were basically designed for installation into new piping systems by flanging, threading or welding. These attachment methods are extremely difficult and time consuming because the entire piping system must be shut down and drained before installation can begin. Shutting down the system or having the system break down in an emergency can easily cost thousands of times the price of the failed valve in lost production, poor quality product or environmental spills. Emergency repairs or mill shut downs are caused many times due to seized or leaking valves.

Vast numbers of valves are installed on existing pipes each year throughout the world. They provide shut off, by-pass, automatic control, allow installation of new equipment and/or prevent environmental spills. Each installation is very labour intensive and time consuming as the existing pipe must be cut through with saws or torches, attachments added such as welded-on flanges or threaded pipe ends, and the new valve bolted, threaded or welded into place.

Technology presently exists to install branch connections into main lines which are in service. Basically, small branch lines are used to attach instruments or by-passes to a main pipe while leaving the main pipe intact and undisturbed. These "hot-tap" connections were never designed to shut off or control flow in the main pipe.

Other technology exists to shut off flow in a main line while in service. Basically these are large, complicated, expensive, labour intensive, specialty devices used for a one-time shut off during an emergency situation. The following is a summary of typical prior art of this type including some of their associated problems.

1. Rubber Bladder—rubber bladders are placed into the main line through a small branch connection and inflated with compressed air to seal against the inside wall of the pipe. These rubber bladders are easily cut, can stop but not control flow, and were designed for one time emergency operation.

2. Tapered Metal Plug—the top half of an existing pipe is cut off and a full sized tapered steel plug is set into the line. The existing-pipe wall must be cut and then machined to give a good mating surface for the plug to seal against. This method requires highly specialized operators, a large apparatus to seal during consecutive steps in the operation, is expensive, yields much contamination due to the cutting operation and requires the new housing to be welded to the existing pipe. These plugs were designed to install full size branch connections or to shut off main line flow at high temperatures during extreme emergency situations.

3. Downstream Disc—the top half of the existing pipe is cut off in successive actions as described above. A full size disc is passed through the branch connection to seal against the inside of the existing pipe. This method has all the disadvantages listed in item No. 2 and was designed for one-time emergency shut-off of main line flow. 4. Hydraulic Shear/Score Tool/Saw—these methods include cutting completely through the existing pipe and welding the valve housing to the pipe for structural integrity. These are the largest, most complicated systems. These procedures may be very time consuming and should be performed by a machinist-type operator. 5. Oil Wells—a number of methods have been designed specifically for the oil industry to cap well heads. Basically these systems were designed to shut off flow in a center pipe after cutting through two concentric outer pipes. Many of the highly specialized devices are so specific that they do not apply to the situations commonly encountered in industrial plants.

SUMMARY OF THE INVENTION

A basic object of the present invention is to provide an apparatus and method which allows installation of virtually any type of valve in-line into an existing pipe without requiring shut off of flow or pressure within the pipe and which is quick, complete and requires no process shutdown. The invention provides a basic departure from the various prior art devices which appear to have been designed mainly for one-time shut off during an emergency situation.

Various technical problems associated with prior art devices and techniques including clamping, sealing, cutting, advancing a pipe cutter, blow-out protection, contamination and material compatibility have been substantially overcome by the present invention.

Accordingly the invention in one aspect provides an apparatus for installing and/or replacing a valve on an existing pipe which may be under fluid pressure. The apparatus includes: a main housing including a pair of separable housing members together defining a first bore extending along a first axis for receiving the pipe and embracing the same. These housing members also define a second bore extending along a second axis intersecting the first axis in transverse relation thereto. An annular cutter disposed in said second bore is capable of being advanced along said second axis for cutting and removing a section of the pipe located within said main housing. A further member is axially movable with said cutter along said second bore into a predetermined axial position adjacent the ends of said pipe after said pipe section has been removed by said cutter. The further member has a port means extending transversely therethrough causing flow through said pipe to be selectively enabled and disabled when said further member is selectively moved or positioned such as to bring said port means into and out of alignment with said first axis along which the pipe extends. A sealing means is located within said main housing for forming a fluid tight seal between the pipe and each of said housing members when in use and also around said further member when it is in said axial position for enabling and disabling flow through said pipe.

In a further aspect the apparatus may include a jacking means to assist in advancing said cutter and further member along said second bore against the pressure of fluid which may be in said pipe during the cutting thereof.

In accordance with a further feature said jacking means comprises a jacking cylinder attached to one of said housing members. A jacking piston is located within said cylinder and is capable of bearing against said further member to urge same along said second bore when fluid pressure is introduced into the jacking cylinder.

In accordance with a further feature there is provided a jacking ram attached to said jacking piston and extending outwardly of the jacking cylinder so that rotation of said ram rotates said piston. Means are provided for interengaging said piston and further member for rotation together whereby rotation of said ram effects rotation of the further member and the annular cutter to effect cutting of the pipe.

In accordance with a still further feature said further member is in the form of a hollow sleeve, and a valve member located within said sleeve in fluid sealing relation therewith and in communication with said port and movable relative to said sleeve to control flow of fluid through said pipe when said sleeve is in said predetermined axial position with said port means in alignment with said pipe.

In accordance with a further feature the jacking cylinder is removable from said one housing member so that the jacking cylinder and jacking piston may be removed therefrom after said sleeve has been moved to said predetermined axial position within the second bore.

In accordance with a still further feature said sealing means comprises a resilient seal body of substantially incompressible material with each of said housing members including a movable compression element mounted therein for movement along said second axis and being located on opposing sides of said resilient seal body such that movement of said compression elements toward each other serves to compress said resilient seal body into tight sealing relation with the pipe and the hollow sleeve.

In accordance with a further feature said compression elements each comprise an annular bushing slidably and sealingly engaged in respective annular chambers formed in said housing members. Means are provided enabling fluid pressure to be applied to said annular chambers to cause the annular bushings to be urged toward each other to compress the resilient seal body.

In accordance with a further feature there is provided a sub-housing secured to said main housing such as to receive therein said cutter and the section of pipe removed therefrom following completion of cutting and axial movement of the hollow sleeve to said predetermined axial position.

In accordance with a further feature said cutter is removably attached to said hollow sleeve and said sub-housing is removably attached to said main housing whereby both the sub-housing, cutter and cut pipe section may be removed from the main housing. A cover member is adapted to be secured to the main housing in place of said sub-housing and means are provided to secure said hollow sleeve to said cover member to fix the predetermined axial position of the sleeve.

In accordance with a still further feature said valve member has an operating stem thereon which projects outwardly of said one housing member to allow a valve operator to be connected to it after removal of the jacking cylinder from said one housing member. A further cover member is provided for securement to the main housing after said jacking cylinder is removed therefrom, said further cover member providing access to the operating stem of said valve member to permit actuation of the latter from outside the main housing.

In accordance with a further feature both of said cover members are further adapted to exert axial forces on said annular compression bushings when secured to said main housing whereby to maintain the resilient seal body under compression and in sealed engagement with the pipe and said hollow sleeve member.

In accordance with a further feature there is provided a means interacting between said main housing and the pipe when in use to resist axial blow-out of the pipe after cutting thereof under the influence of pipe internal fluid pressures.

In accordance with a further feature said annular cutter comprises a toothed hole saw. Carbide and diamond inserts may also be used as a cutting means.

In accordance with an alternative feature said annular cutter comprises a sharp knife edge used to cut through softer pipe materials.

In accordance with a still further feature said valve member which is located in the sleeve comprises any one of: a plug valve, a ball valve, a butterfly valve, a plunger valve, a gate valve, a spool valve, a globe valve, a needle valve, a check valve, or a diaphragm valve etc. (without said operating stem) etc.

In accordance with a further major embodiment of the invention there is provided a modified form of apparatus for installing a valve on an existing pipe under fluid pressure. The modified apparatus includes a main housing including a first pair of separable housing members adapted to be located on opposing sides of the pipe. A second pair of separable housing members together define a first bore extending along a first axis for receiving the pipe and embracing the same. The second pair of housing members are releasably securable together independently of said first pair of housing members so that the first pair of housing members can be removed while leaving the second pair of housing members secured together in embracing relation to the pipe to form a "permanent" valve installation. The first pair of housing members are releasably securable together on opposing sides of said second pair of housing members to secure the former to the pipe when in use. The second pair of housing members also define a second bore extending along a second axis and intersecting the first axis in transverse relation thereto. An annular cutter is carried by one of said first pair of housing members and is capable of being advanced along said second bore for cutting and removing a section of the pipe located between said second pair of housing members. A further member is axially movable with said cutter along said second bore into a predetermined axial position adjacent the ends of said pipe after said pipe section has been removed by said cutter. The further member has a port means extending transversely therethrough causing flow through said pipe to be selectively enabled and disabled when said further member is selectively moved or positioned such as to bring said port means into and out of alignment with said first axis along which the pipe extends. Sealing means are located within said second pair of separable housing members for forming a fluid tight seal between the pipe and each of said second pair of housing members when in use and around said further member when in said axial position for enabling and disabling flow through said pipe.

DETAILED DESCRIPTION OF PREFERRED EMBODIMENTS

Figure 1:
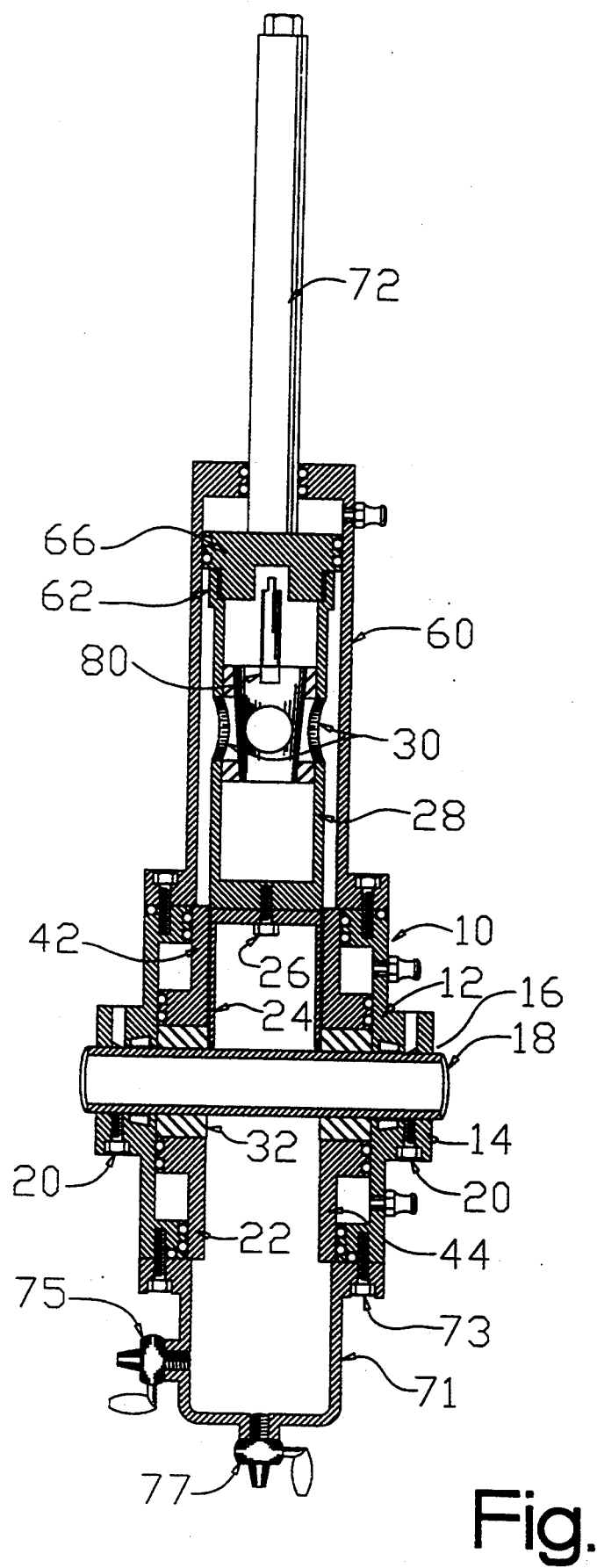
FIG. 1 is a vertical cross-sectional view of a first embodiment of the valve showing the main housing clamped onto an existing pipe prior to installation of the valve.
Figure 2:
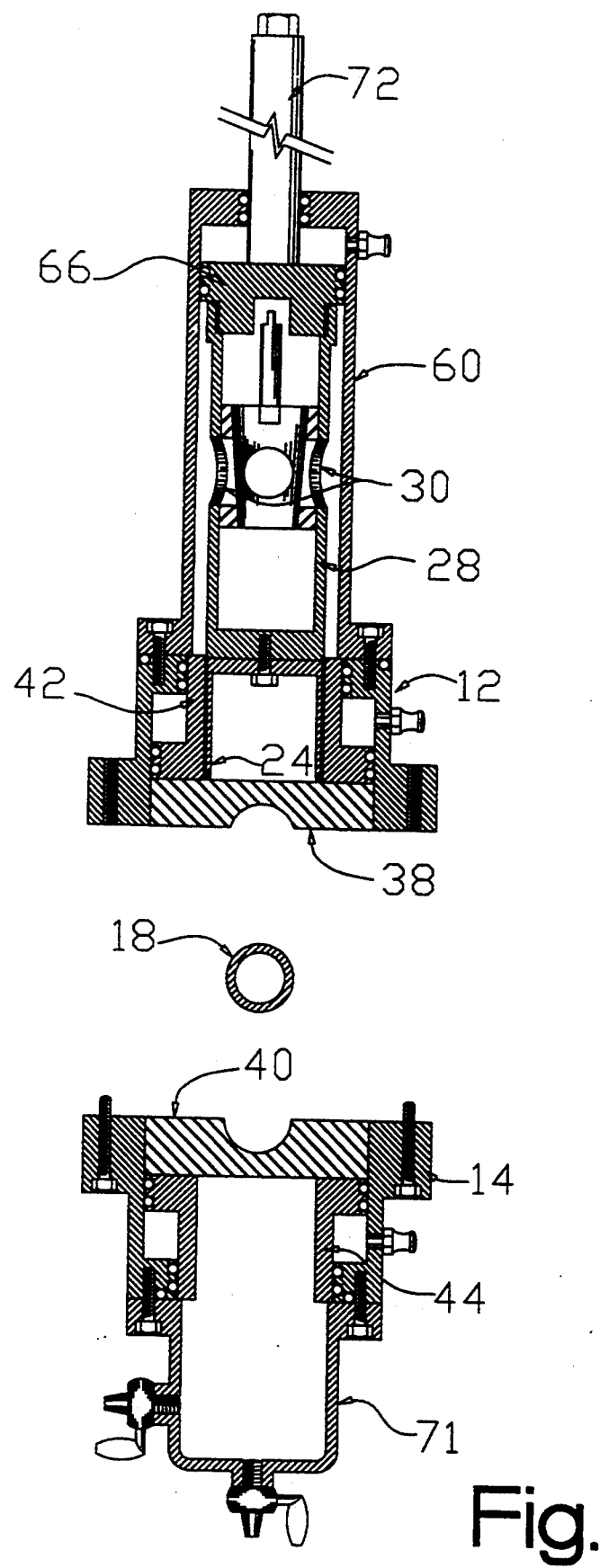
FIG. 2 is a cross-sectional view taken at 90° to the cross-sectional view of FIG. 1 looking along the pipe and showing the upper and lower housings separated from one another on opposing sides of the pipe.
Figure 3:
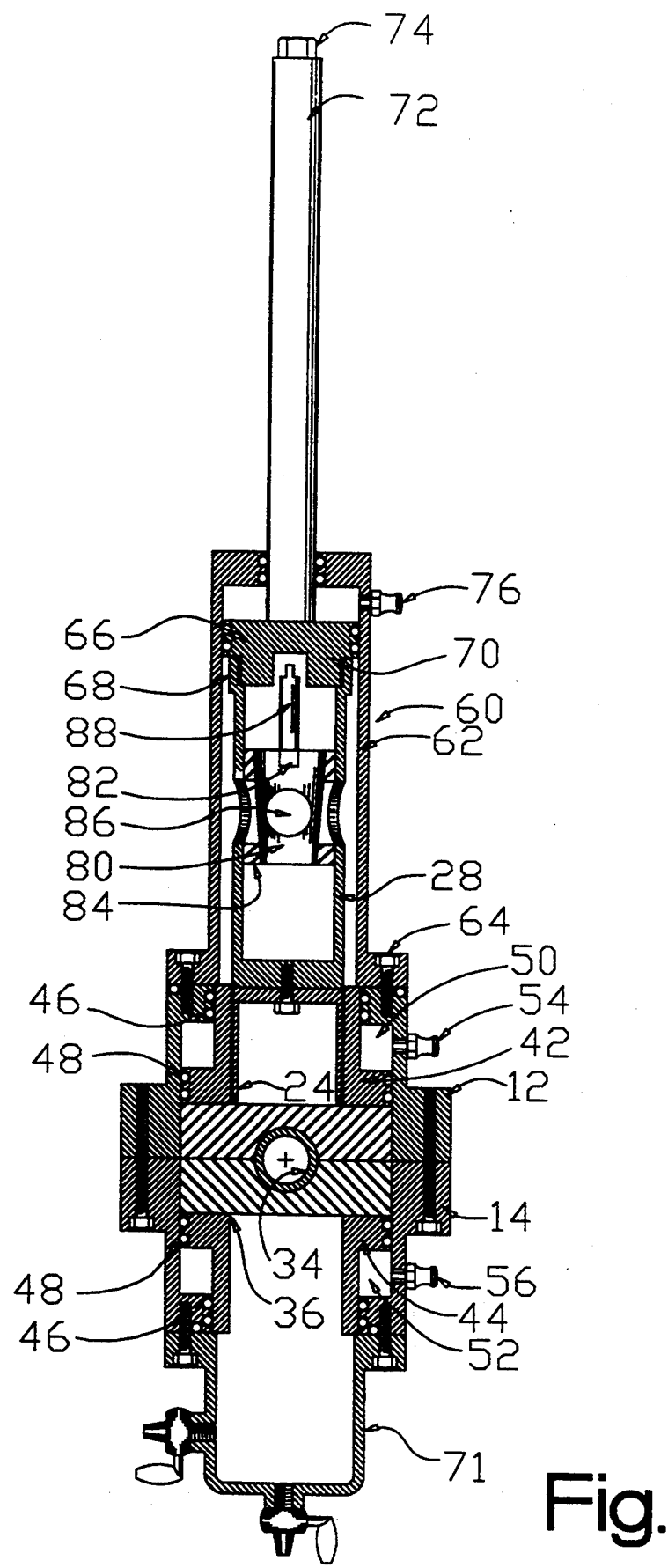
FIG. 3 is a cross-sectional view similar to FIG. 2 looking along the pipe axis and with the upper and lower housings clamped together around the pipe.

Reference will now be had to the first embodiment of the invention as illustrated in FIGS. 1-8. The apparatus as shown includes a main housing 10 including upper and lower separable housing members 12 and 14 which together define a first cylindrical bore 16 extending along a first axis for receiving the pipe 18 and embracing the same. The split main housing 10 comprising the above-mentioned upper and lower housing members 12 and 14 permits installation of the apparatus without disturbing the contents, e.g. pressurized fluid, within an existing pipe. Since the shape and size of the first bore 16 defined by the housing members matches the outside diameter of the pipe, the pipe and housing 10 are held properly aligned during the entire installation operation. The two halves of the main housing, i.e. the upper and lower housing members 12 and 14, are secured together by cap screws 20 which supply ample clamping force and at the same time properly align the upper and lower housing members 12, 14.

The housing members 12, 14 include structures defining a second bore 22 which extends along a second axis intersecting the first axis along which pipe 18 extends, in transverse relation to it. An annular cutter in the form of a hole saw 24 is located in the second bore 22 and is capable of being rotated about the second axis and being advanced axially along the second axis for cutting and removing a section of the pipe 18 located in the main housing 10.

The upper end of hole saw 24 is secured by a bolt 26 to the lower end of a cylindrical sleeve member 28, which sleeve 28 is axially movable with the cutter or hole saw 24 along the second bore into a predetermined axial position adjacent the ends of pipe 18 after the pipe section has been removed by the hole saw following a cutting operation. The sleeve 28 has a port 30 extending transversely through it hence causing flow through the pipe 18 to be selectively enabled and disabled when the sleeve 28 is in the aforementioned predetermined axial position and when the sleeve 28 is selectively rotated about the second axis so as to bring the port 30 into and out of alignment with the first axis along which the pipe 18 extends.

A seal assembly 32 is located within the main housing 10 for forming a fluid tight seal between the pipe 18 and each of the housing members 12, 14, when in use and also around the cylindrical sleeve 28 when the latter is in the axial position required for enabling and disabling flow through pipe 18.

Figure 4:
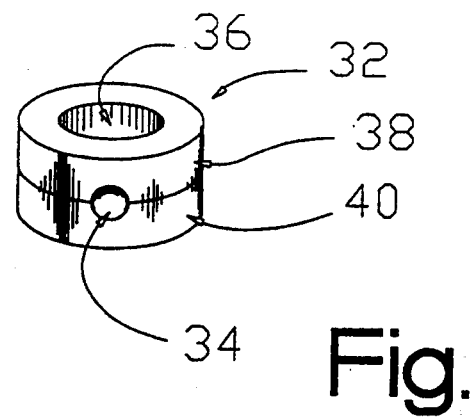
FIG. 4 is a perspective view of the resilient seal members which prevent leakage of pressurized fluid during the valve installation procedure.
Figure 6:
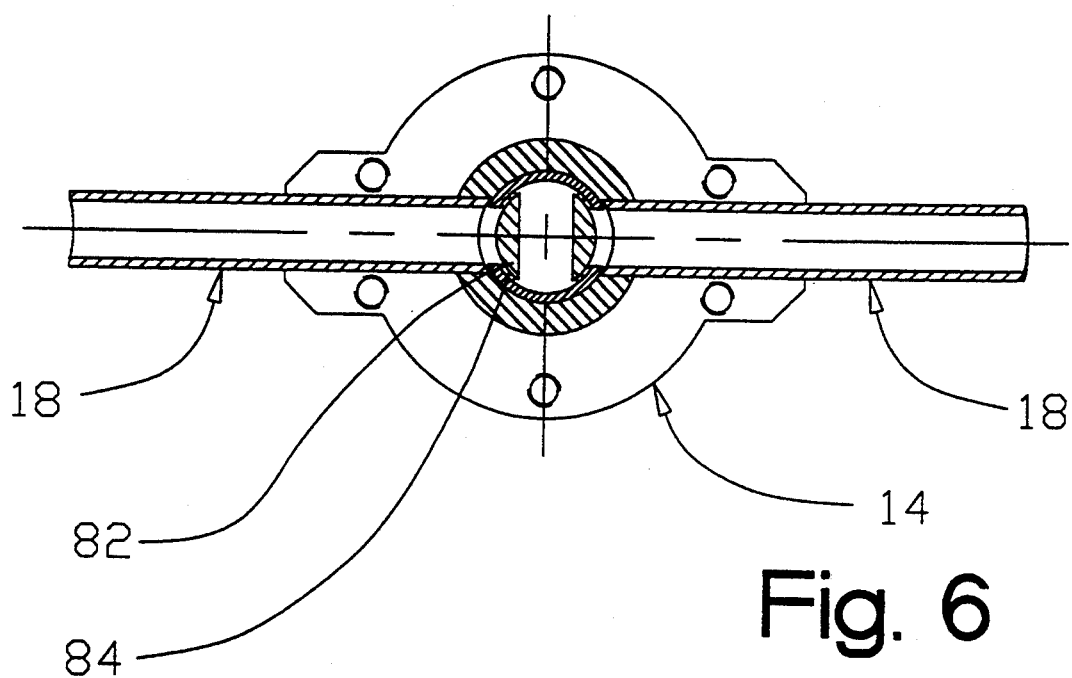
FIG. 6 is a cross-section view looking downwardly from above and taken along the centerline of the pipe at section lines 6—6 in FIG. 5.

Referring to FIG. 4, the seal assembly comprises a cylindrical body having a first cylindrical aperature 34 extending therethrough and sized to snugly accommodate the exterior of pipe 18, and a second cylindrical aperture 36 sized to snugly accommodate the exterior surfaces of the sleeve 28 after being compressed. The seal assembly is divided into upper and lower halves 38 and 40.

The seal assembly 32 is made of a suitable elastomeric material with each half being sized such that when the upper and lower housing members are fastened together by cap screws 20, the seal assembly becomes tightly compressed around the pipe. This prevents process liquid from leaking along the outside of the existing pipe and also out through the split in the main housing between the upper and lower housing members 12, 14. The inside diameter of the cylindrical aperture 36 is just slightly larger than the outside diameter of the teeth of the hole saw 24 so that the seal assembly is not damaged during the pipe cutting operation. Following the cutting operation, the seal assembly 32 is compressed tightly around the cylindrical sleeve 28 to prevent process liquid from leaking from the upstream side of the valve to the downstream side.

In order to apply compression forces to the seal assembly 32, the housing members 12 and 14 include respective annular compression bushings 42, 44 each of which is slidably and sealingly engaged by virtue of suitable O ring seals 46, 48, in respective annular chambers 50, 52, formed in the aforementioned housing members. Each of the annular chambers 50, 52 is provided with a respective fluid inlet port 54, 56, each port being provided with a suitable one-way check valve in order to admit pressurized fluid into the annular chambers thus forcing the annular compression bushings 42, 44 toward each other and therefore compressing the seal assembly 32 tightly around the cylindrical sleeve 28 so as to prevent process liquid from leaking from the upstream side of the valve to the downstream side. This also prevents leakage out through the top and bottom housings.

Figure 7:
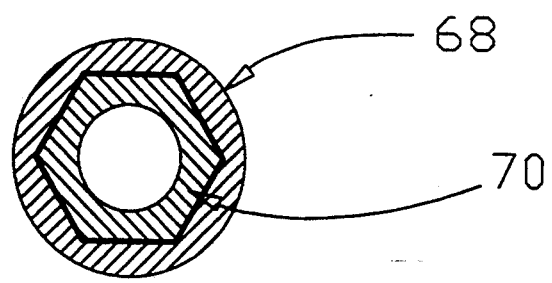
FIG. 7 is a partial section view taken along section lines 7—7 in FIG. 5 and showing the hex drive between the jacking ram and the sleeve.

A jacking assembly 60 is provided to advance the sleeve and the hole saw 24 along the second bore against the pressure of process fluid which may be in the pipe during the cutting of same. The jacking assembly includes a jacking cylinder 62 secured by cap screws 64 to the upper end of the upper housing member 12. A jacking piston 66 is located within the jacking cylinder 62 in sealed engagement therewith via suitable O ring seals and the piston 66 bears against and enters downwardly into the open upper end of the sleeve 28, sleeve 28 being provided with an outwardly stepped annular portion 68 at the upper end of same. That portion 70 of the piston 66 which fits into the upper end portion 68 of sleeve 28 is best illustrated in FIG. 7 and it will be seen that the downwardly extending portion 70 of the piston is in the form of a hexagon which fits into the correspondingly shaped outwardly stepped portion 68 at the upper end of sleeve 28. A ram 72 is fixed to the piston 66 and extends outwardly and upwardly of the jacking cylinder. The upper end of the ram 72 is provided with a hexagonal nut 74 or other suitable means enabling ram 72, piston 66, sleeve 28 and hole saw 24 to be rotated together about the second axis defined by the housing structures described previously.

The upper end of the jacking cylinder 62 is provided with a jacking fluid inlet port 76 complete with a suitable ball check valve. Hence, as pressurized fluid is applied to the jacking cylinder, a downward force is applied to the piston 66 which is ultimately transmitted via the sleeve 28 to hole saw 24. As the hole saw 24 is rotated during an installation procedure, it ultimately cuts through the wall of the pipe 18. If the pipe is pressurized, the fluid pressure applied to the upper side of piston 66 must be sufficient to overcome the opposing forces generated thus allowing the cutting to proceed as the hole saw is rotated. If leakage around the pipe begins to occur, the seal assembly 32 can be further compressed by applying additional pressure to the compression bushings 42 and 44 via the fluid inlet ports 54 and 56 noted previously. The hydraulic pressure may be applied by a hydraulic pump or a hand-held manual jack.

The lower end of the lower housing member 14 has a chamber or sub-housing 71 removably attached to it by means of suitable cap screws 73. The chamber 71 is of sufficient size and depth as to receive therein the hole saw 24 and the piece of cut pipe after completion of the cutting operation, reference being had in particular to FIG. 5. Chamber 71 is provided with a flushing port 75 and a stop cock as well as a drain port 77 also with a suitable stop cock. It should also be noted here that the upper end of chamber 71 serves to limit the downward extend of movement of the lower compression bushing 44. In like manner, the lower extremity of jack assembly 60 limits the upward extent of movement of the upper compression bushing 42. Hence, the seal assembly 32 is maintained under at least a nominal degree of compression force when the upper and lower housing members 12, 14 are assembled about pipe 18 even in the absence of any substantial degree of fluid pressure existing within the aforementioned annular chambers 50 and 52.

It will of course be realized that the elastomeric seal assembly 32, although being flexible or deformable, is at the same time substantially incompressible. Hence, as the material is compressed by the annular compression bushings 42 and 44, the elastomeric material exerts an equal pressure in all directions on whatever contains it. Hence, leakage around the pipe as well as leakage around the sleeve 28 is substantially prevented under normal circumstances. The hardness of the seal assembly should be selected dependent upon the pressures which are to be contained. In the lower pressure ranges, softer materials can be used but in high pressure applications, where there is a danger of extrusion of soft materials, harder elastomers, e.g. higher Durometer readings, should be selected.

A packing material may be used in high temperature applications such as steam. This material will keep sealing, incompressability and workability properties intact, even at elevated temperatures.

Figure 5:
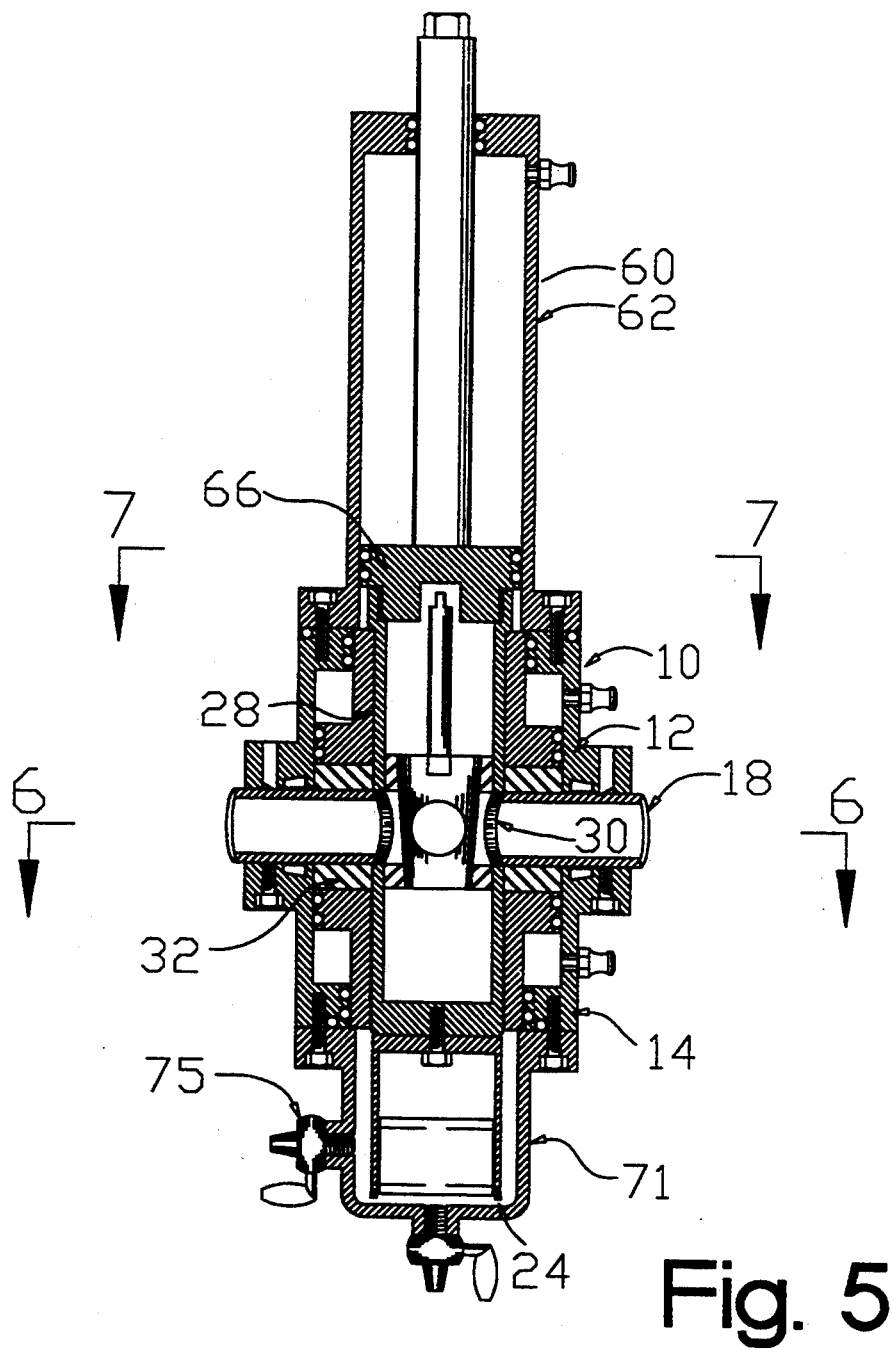
FIG. 5 is a further cross-sectional view of the apparatus after the pipe has been cut through and the sleeve/valve assembly jacked into its final position.

As was mentioned previously, the existing pipe is completely cut through by the hole saw 24 as the latter is rotated and advanced axially under the influence of the rotational and axial forces applied to it by virtue of the jacking assembly 60 described above. A soft metal ring (not shown) may be installed next to the upper half of the compression seal assembly 32 to guide the hole saw 24 during the entire cutting operation and to prevent jamming. Several slots (not shown) in the hole saw 24 are typically provided to allow fluid pressure in the pipe to be continually relieved downstream therefore helping to maintain hole saw alignment. The entire assembly, i.e. ram 72, piston 66, sleeve 28 and hole saw 24, may be rotated by means of an electric drill attached to the upper end of the ram 72. The thin kerf of the hole saw 24 produces a relatively low quantity of cuttings and the fine teeth of same tend to yield small metal particles that do not plug in the drains. No metal curls are produced because there are no drills as in many of the prior art arrangements. The piece of pipe that has been removed remains safely inside the hole saw cavity with both the hole saw and the piece of pipe ultimately entering into the bottom chamber 71 as best seen in FIG. 5.

Once the pipe cutting process has been completed and the sleeve 28 has been axially advanced to the predetermined position wherein the ports 30 therein are in alignment with the axis of the pipe 18, the sleeve 28 in itself is capable of functioning as a shut-off valve disenabling or enabling flow through pipe 18 merely by rotating sleeve 28 about its axis thereby to move the ports 30 into or out Of fluid communication with the interior of the pipe. However, in order to provide for a better control of the flow of fluid through the pipe, the sleeve 28 is provided with a suitable form of conventional valve designated in FIGS. 1–8 by reference character 80. Valve 80 as shown is a conventional plug valve having a tapered plug 82 rotatable about its axis and snugly fitted into a valve seat 84 of any suitable material, e.g. synthetic plastics or elastomeric materials depending upon the temperatures and fluid pressures likely to be encountered. The plug 82 is provided with a through port 86 and when the plug 82 is rotated about its axis by way of valve stem 88, fluid flow through the valve 80 is enabled or disabled as the case may be.

Figure 8:
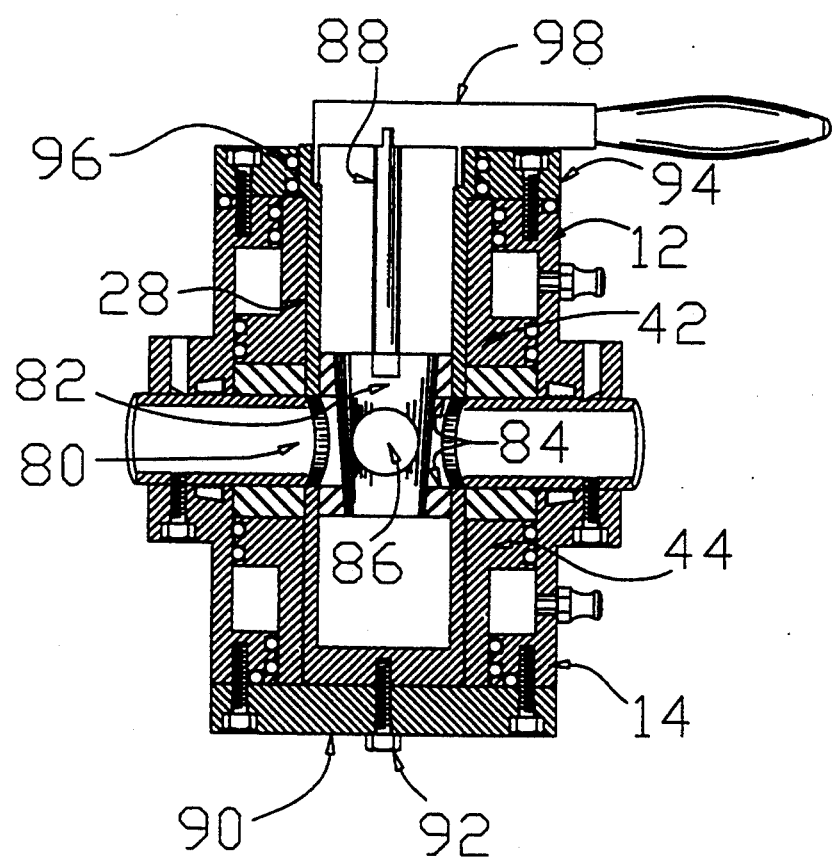
FIG. 8 is a further cross-section view showing the apparatus after the jacking ram and cylinder as well as the lower sub-housing have been removed leaving only the permanent valve assembly that remains on the pipe in service.
Figure 8A:
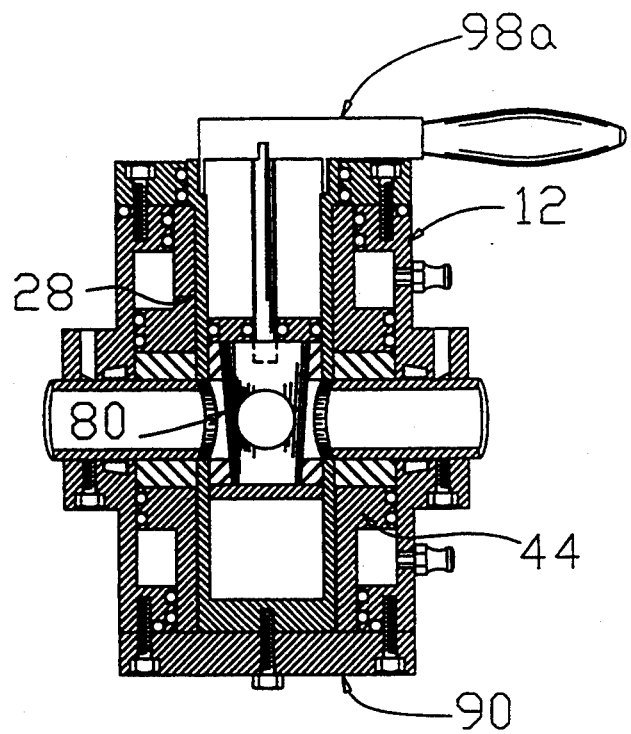
FIGS. 8A through 8J are cross-sectional views similar to FIG. 8 and illustrating optional valve types which may be installed comprising plug, ball, butterfly, plunger, gate, needle, spool, globe, check and diaphragm valve options.
Figure 8B:
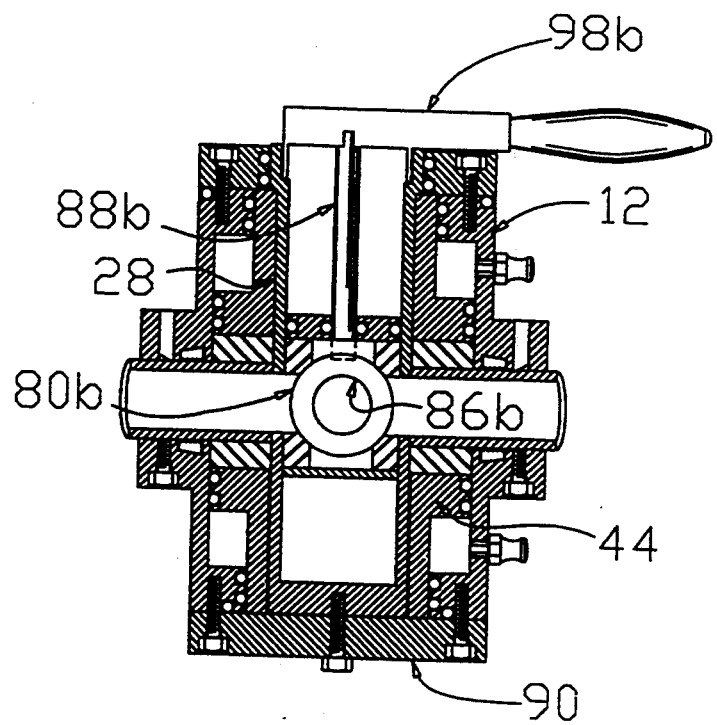

FIG. 8 shows the configuration of the valve assembly subsequent to removal of the jacking cylinder, piston and ram assembly from the upper housing member 12 as well as removal of the bottom chamber 80 from the lower housing member 14. A flat bottom cover plate 90 is bolted to the lower end of the lower housing member 14 in sealed relation thereto by virtue of suitable O ring seals, and a stud 92 is inserted and threaded upwardly into the lower end of the sleeve 28. This fixes the sleeve 28 firmly in position with its ports in alignment with the open ends of the cut pipe. Bolting the bottom cover plate to the hollow sleeve allows both compression bushings 42 and 44 to tightly compress both seals mechanically. Therefore hydraulic fluid is only required for the initial installation. Furthermore, at the upper end of the upper housing member 12, following removal of the jacking cylinder 62 and related assemblies, a ring-shaped retainer plate 94 is secured by cap screws to the upper end of the upper housing member 12. Cover plate 94 is in fluid tight sealed relation with the upper outwardly stepped end of sleeve 28 by virtue of the O ring seals 96. The upper end of the previously mentioned valve stem 88 is engaged by a suitable valve stem actuating lever 98.

It should be emphasized that the plug valve 80 shown in FIG. 8 (as well as in FIGS. 1, 2, 3 etc.) is only one of many types of valve configurations which can be located within the sleeve 28. In fact virtually any reasonable form of valve can be installed in line utilizing the structures described above. Once the valve has been installed, and after some use valve service is required, it is a simple matter to rotate the sleeve 28 by 90° thereby to shut off the flow through the pipe following which the valve 80 can be taken out of sleeve 28 and repaired or replaced.

Some of the several types of valves which may be positioned within sleeve 28 are illustrated in FIGS. 8B through 8J. For example, in FIG. 8B, the plug valve previously described has been replaced with a ball valve 80b, the same having the usual through port 86b with the ball valve being provided with the usual ball valve seats to prevent leakage and a valve stem 88b for actuating the same via an actuating lever as described previously.

Figure 8C:
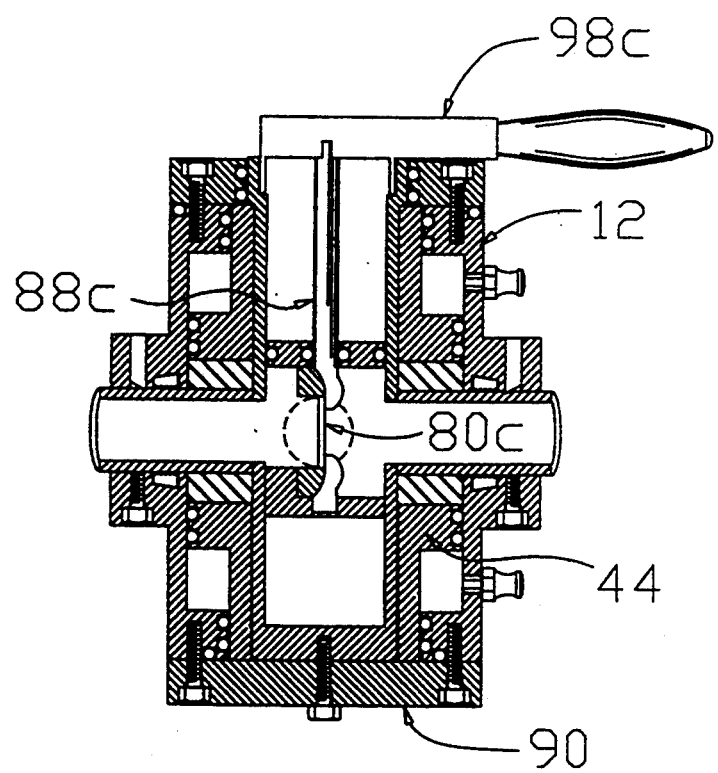
Figure 8D:
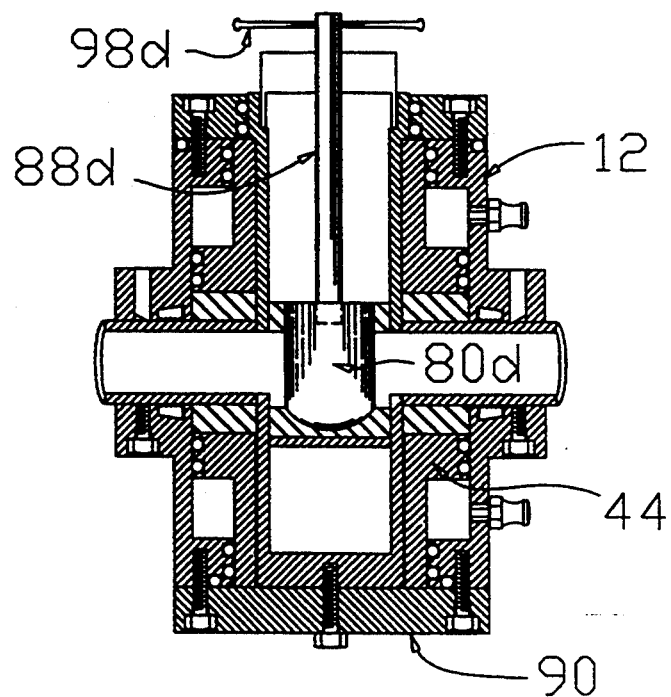

In FIG. 8C, the plug valve has been replaced with a butterfly valve 80c rotatable about a vertical axis by virtue of valve stem 88c and valve actuating lever 98c. Again, in FIG. 8D there is shown a plunger valve option incorporating an axially movable valve plunger member 80d co-operating with a suitable plunger valve seat and valve sealing elements all of which are known per se in the art, with the valve plunger 80d being reciprocated axially between the open and closed positions by virtue of an actuator wheel 98d which co-operates with a threaded valve actuator stem 88d all as generally known in the art.

Figure 8E:
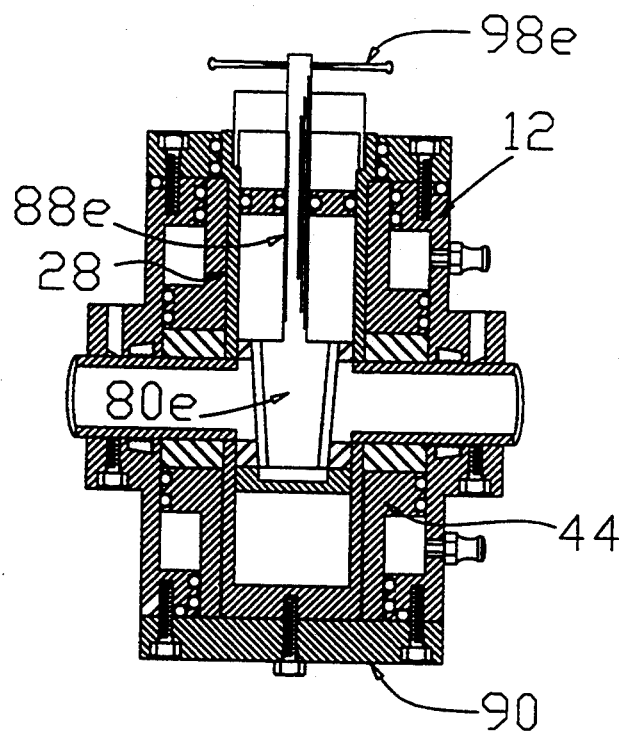
Figure 8F:
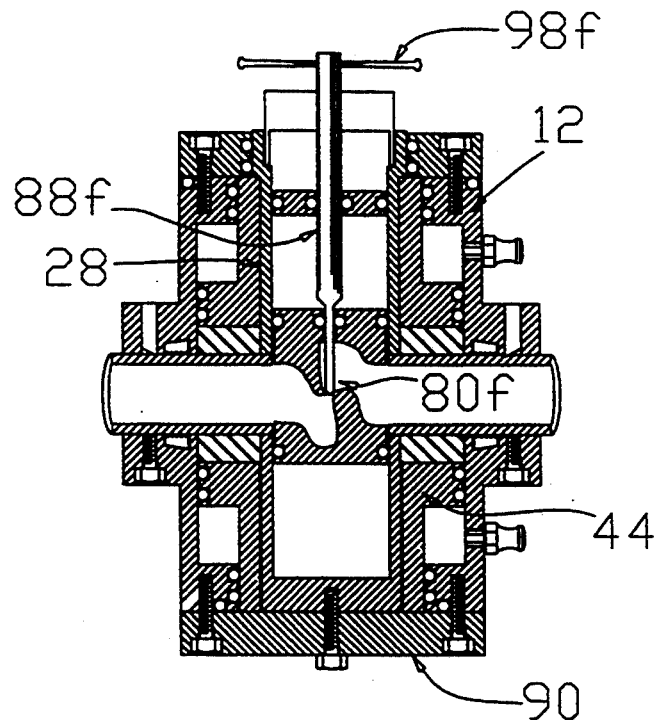
Figure 8G:
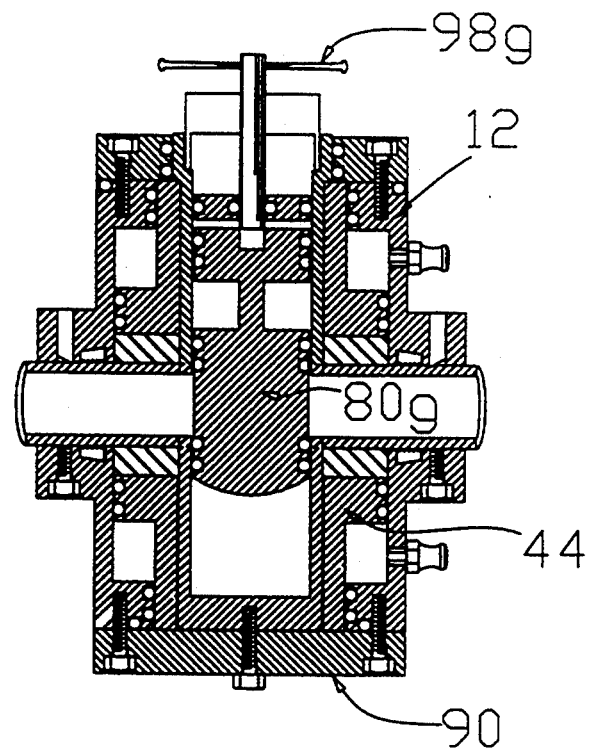
Figure 8H:
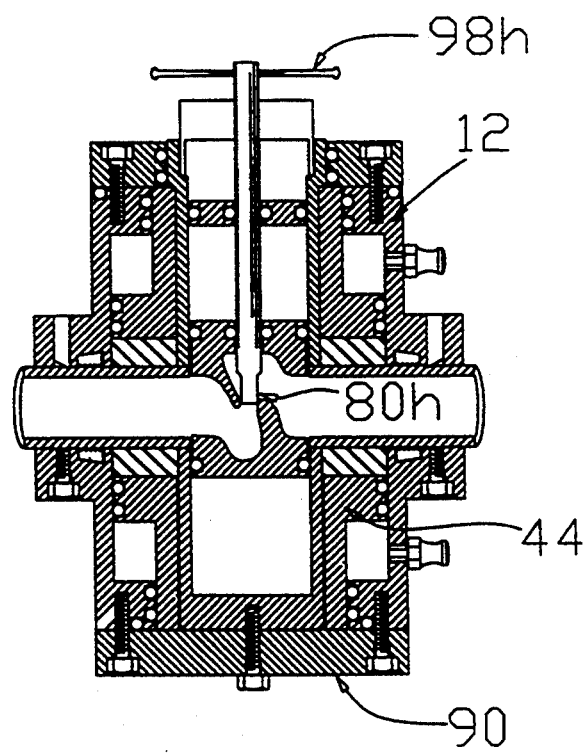

FIG. 8E shows a gate valve arrangement positioned within sleeve 28, the gate 80e being of the tapered or wedge type and being actuated by way of threaded valve stem 88e which co-operates with a rotatable actuator wheel 98e. Similarly, the needle valve option shown in FIG. 8F is actuated in a similar manner, the needle valve being provided with suitable needle valve type seats and the needle valve 80f being moved upwardly or downwardly along the axis of sleeve 28 by means of the threaded valve stem 88f and the hand actuator wheel. Similarly FIG. 8H shows the globe valve option with the valve element 80h being moved in the axial direction relative to the sleeve by virtue of a threaded valve stem as described previously in connection with FIG. 8F. Similarly FIG. 8G shows a spool valve option wherein the valve spool 80g is again moved axially between the flow passing and flow interrupting positions by means of a threaded valve actuating stem and hand wheel.

Figure 8I:
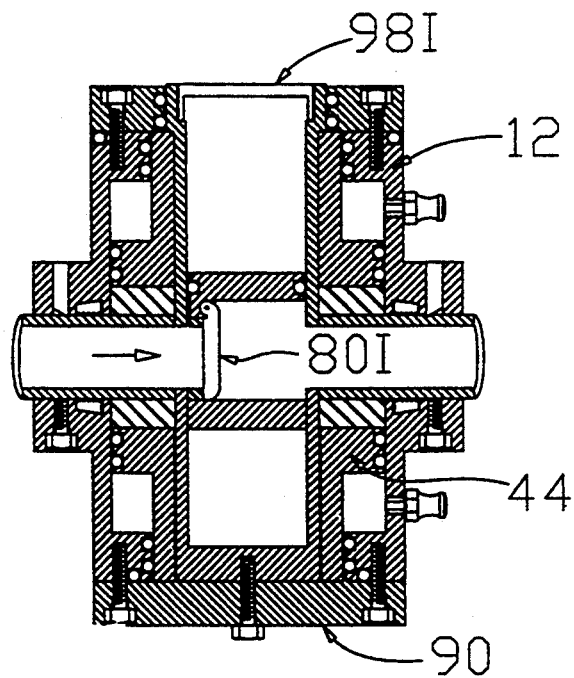
Figure 8J:
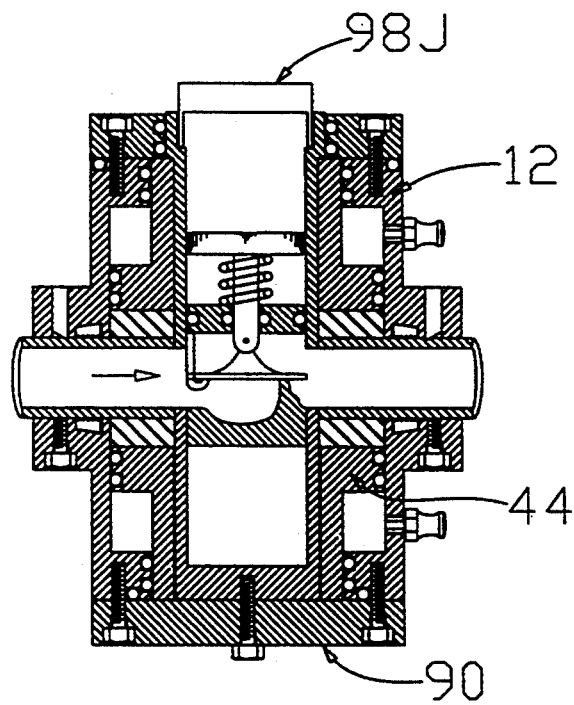

FIGS. 8I and 8J show check valve and diaphragm valve options respectively. The check valve includes a disc-like flap valve hinged at its upper edge for movement between open and closed positions thereby to allow one way flow through the pipe. FIG. 8J shows a spring loaded diaphragm valve which automatically opens as the process fluid pressure increases to overcome the spring pressure. Check valve and diaphragm valve options are designed to show that not all valves require actuator stems or handles and that some operate automatically while completely enclosed.

Figure 9A:
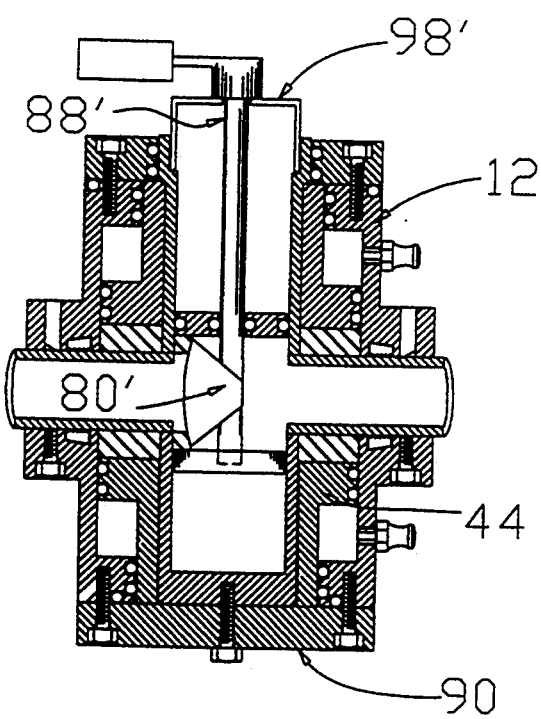
FIGS. 9A and 9B again are views similar to FIG. 8 showing, respectively, a rotary action control valve and a remote actuated sliding valve.
Figure 9B:
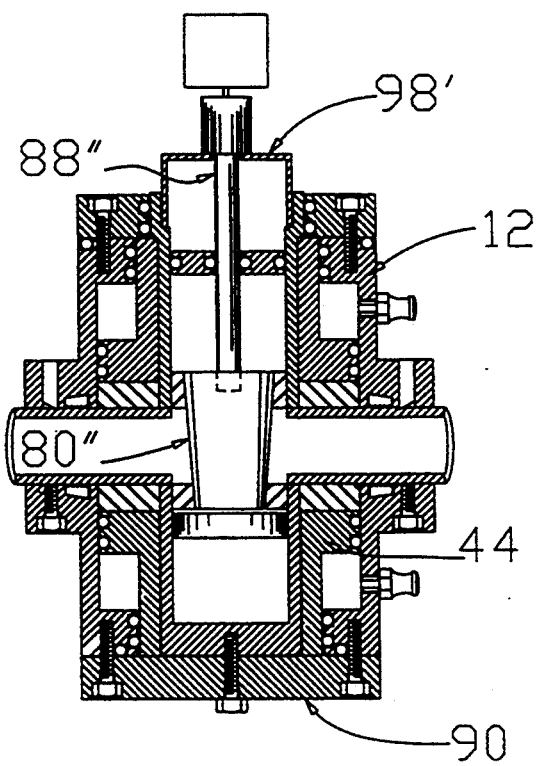

FIGS. 9A and 9B show different forms of control valve options with FIG. 9A utilizing an automatic positioner to rotate the valve stem 88' thereby to bring the control element 80' into the desired angular orientation for controlling the flow. In FIG. 9B the remote actuator effects sliding or axial movement of the valve stem 88'' thereby raising or lowering the wedge or plug type control element 80''.

Figure 10A:
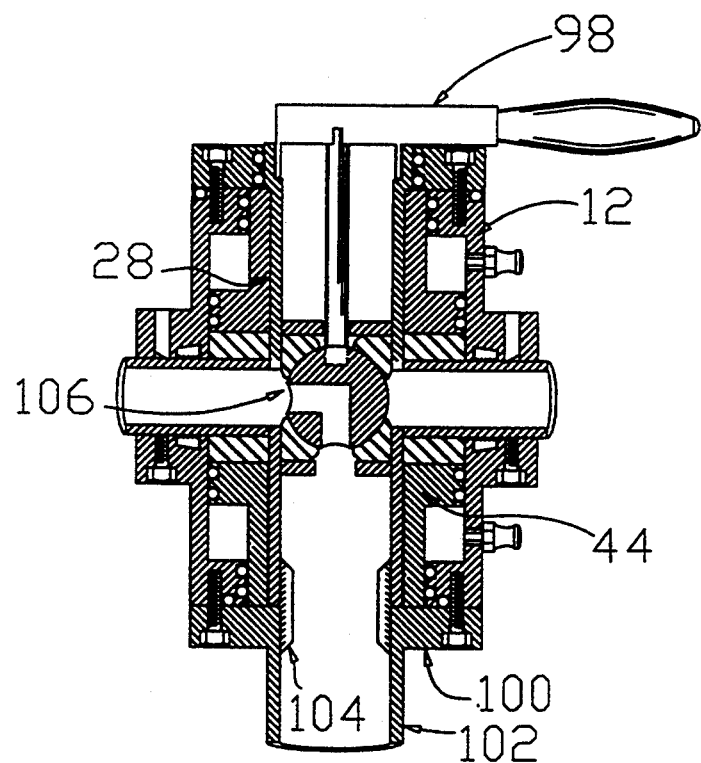
FIGS. 10A and 10B are views again similar to FIG. 8 but showing three-way valve arrangements wherein a pipe is attached to the lower housing to allow fluid flow through the bottom of the installed valve assembly.
Figure 10B:
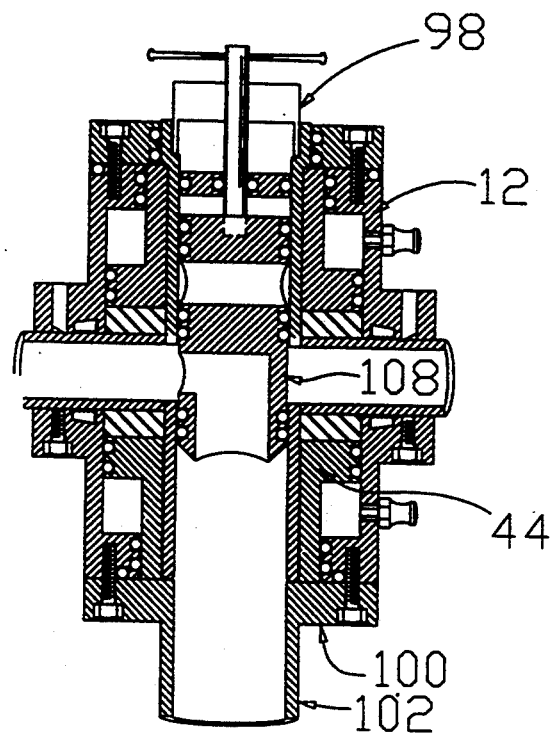

FIGS. 10A and 10B show two different types of three way valve options. In both cases the lower cover plate 90 has been replaced by a flange 100 secured to an outlet pipe 102. The sleeve 28 is restrained in the axial condition by means of externally threaded insert 104 which interconnects the flange 100 with the lower end of sleeve 28.

The three way valve action is achieved by either a rotary valve 106 as in FIG. 10A or by way of a sliding type valve 108 as shown in FIG. 10B. The rotary valve 106 would rotate 180° to allow flow from either the left or right pipe branch while the bottom pipe connection 102 is always open. This yields right angle/right angle flow.

The sliding valve 108 of FIG. 10B, when in the upper position, allows flow from the left branch to the bottom branch 102. Moving the valve 108 into the lower position allows flow straight through from the left to the right branch and this yields both straight through and right angle flow. It can thus be seen that the valve arrangement shown provides the space and means for attachment for three way valves and any arrangement of any three way valve is adaptable. A Tee may also be installed allowing flow in all three branch lines simultaneously.

Figure 11A:
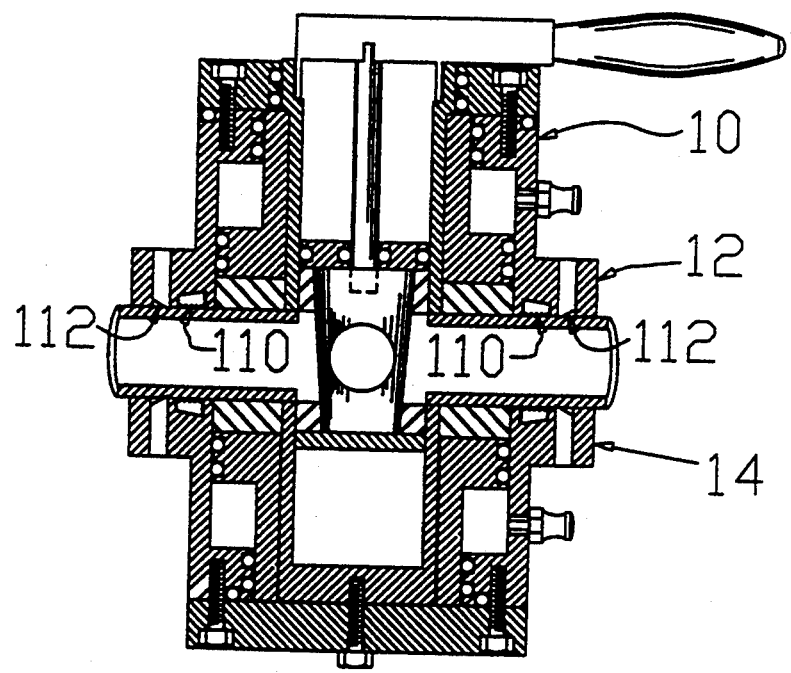
FIGS. 11A through 11d are cross-section views again similar to FIG. 8 but illustrating differing forms of pipe blowout preventors namely standard dogs/wedges, set screws, welding to housing, and welded collars respectively.

FIGS. 11A through lid show various forms of blow out protectors, i.e. means preventing axial blow out of the pipe from the valve assembly as a result of pipe internal pressures.

FIG. 11A shows a two part restraint system for holding the two halves of the pipe from blowing out under pressure. Split rings 110 are located in annular grooves formed in the upper and lower housing members 12, 14 with each of these split rings being of a wedge-shape in cross-section co-operating with a suitably sloped bottom wall in each of the annular grooves. The internal surfaces of each wedge ring 110 are provided with deep serrations which gouge into the pipe as the wedge rings wedge themselves into the valve housing. As the internal pipe pressure increases, and the pipes tend to move outwardly in the axial direction, the restraining effect of the wedge rings 110 is increased. Additionally, dogs 112 in the form of sharp edged projections, are formed in the bodies of the upper and lower housing members, 12, 14, and the act of initially clamping the upper and lower housing members together by virtue of the aforementioned cap screws or bolts, automatically causes the dogs 112 to dig into the wall of the pipe thereby to provide additional restraint.

Figure 11B:
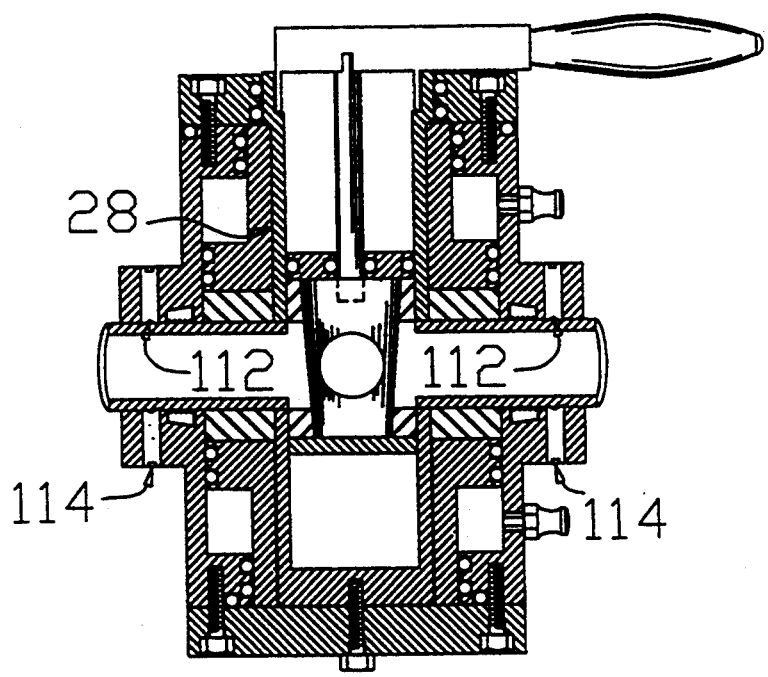

A slightly modified arrangement is shown in FIG. 11B wherein set screws 114 are provided in the upper and lower housing member 12, 14 thereby to maintain the ends of the pipe to prevent axial blow out. The set screws should be provided with coned or hollowed out ends which are capable of biting into the metal of the pipe to provide additional restraint.

Figure 11C:
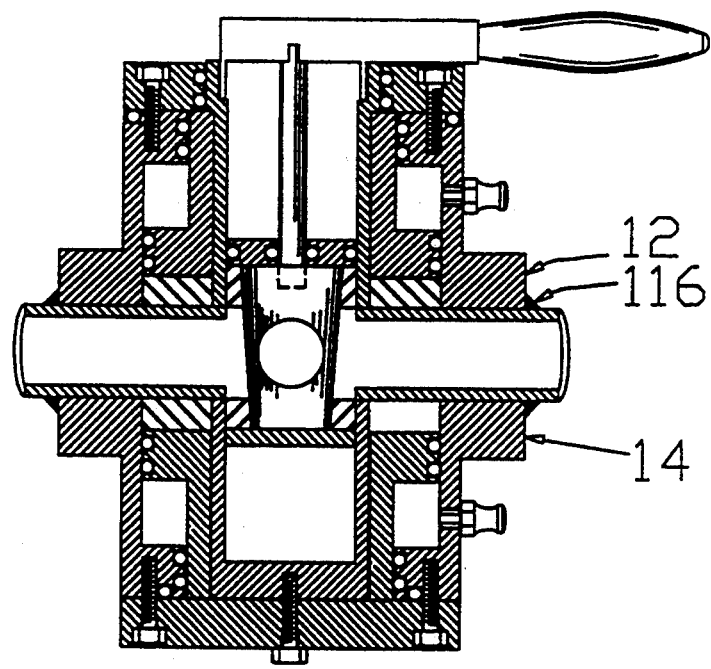

FIG. 11C shows an arrangement wherein welding is done as on certain high temperature or high vibration installations. Welding may also be done as an added back-up to the dogs and/or wedge ring restraints. Steel pipes may be fillet welded as at 116 to the valve housing around the entire circumference of the pipe at both ends of the valve. In high temperature applications where an elastomeric compression seal cannot be safely used, the weld acts as a seal against leaks between the pipe and the housing. In high vibration applications where it is feared dogs might break off, the weld acts as a vibration transmitter by holding the entire assembly tightly together.

Figure 11D:
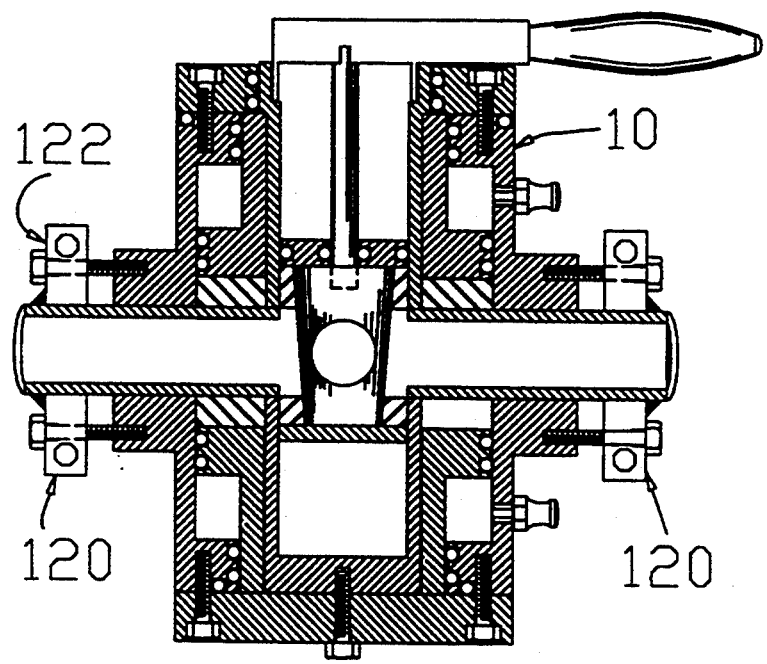

FIG. 11D shows a welded collar 120 at each end of the valve in spaced relation to the valve housing. These collars embrace the pipe and are securely welded to it by means of suitable fillet welds. Threaded studs 122 extending between the collars and the valve housing firmly secure the pipe against axial blow out from the valve housing. These welded collars are used in situations where the high temperatures occasioned by the welding process might adversely affect elastomeric valve parts. Collars 120 transmit vibration and restrain the pipe axially while removing the high temperature weld well away from the valve housing.

Figure 12:
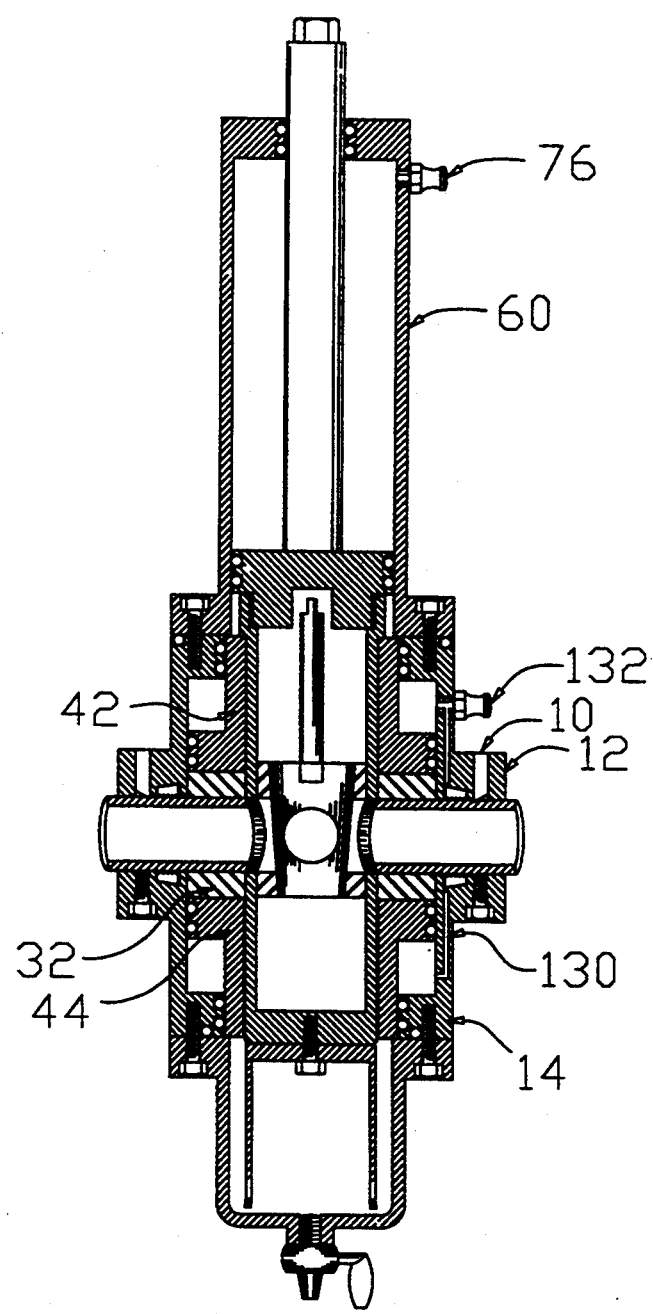
FIG. 12 is a vertical cross-section view very similar to that of FIG. 5 and illustrating a balanced compression bushing arrangement for equalizing pressure on the top and bottom seals.
Figure 13:
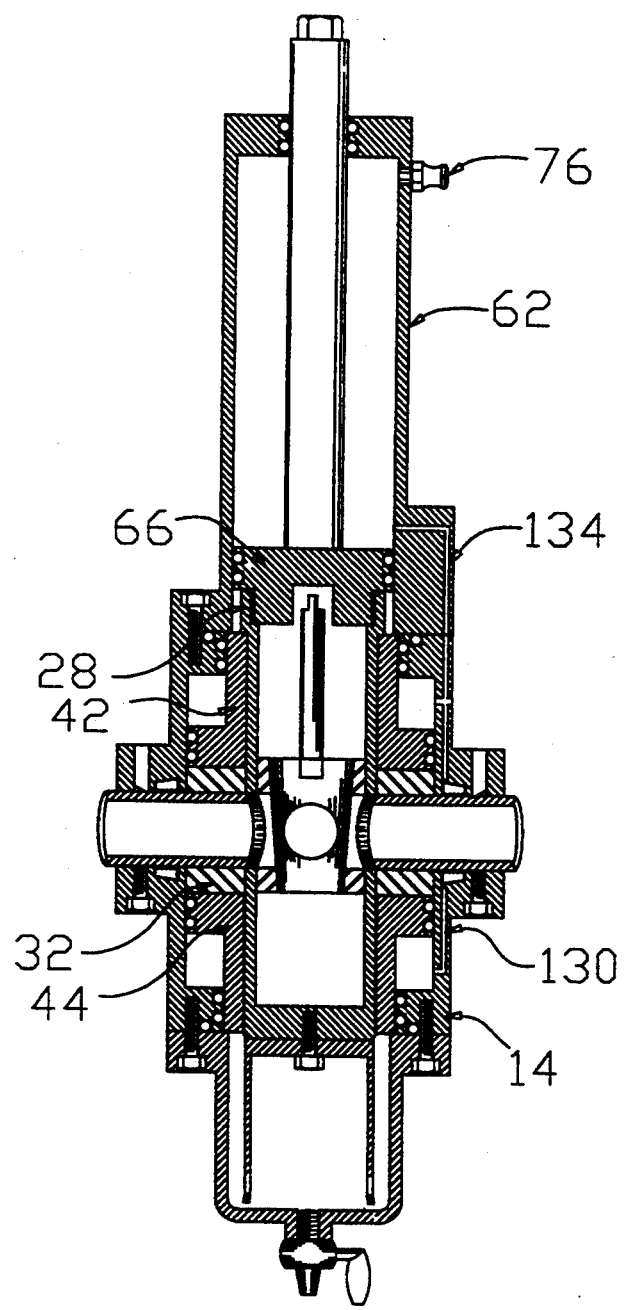
FIG. 13 is a cross-section view very similar to FIG. 12 but showing a modified arrangement wherein the pressurized fluid which advances the jacking ram is also used to apply fluid pressure to the top and bottom compression bushings.
Figure 14:
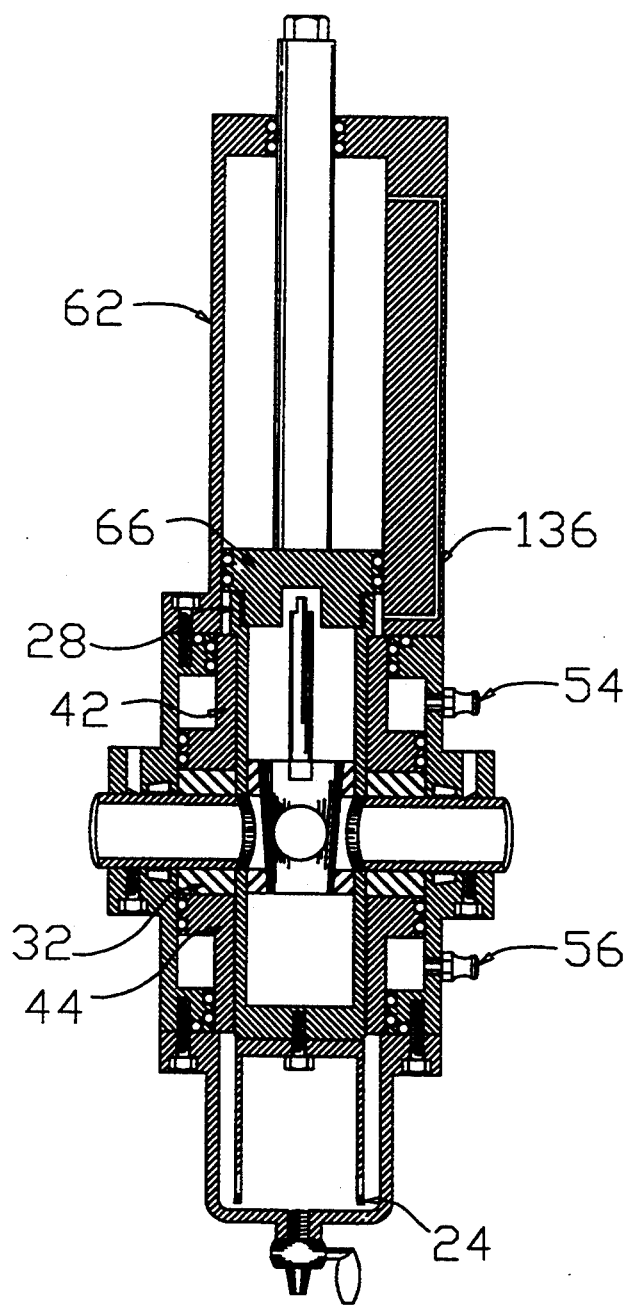
FIG. 14 is a cross-section view very similar to FIG. 12 but showing a channel arrangement for applying process fluid pressure from within the pipeline to the jacking ram chamber to advance the jacking ram.

FIGS. 12, 13 and 14 show modified arrangements for applying hydraulic pressure to the resilient seal assembly 32.

It will be recalled in the embodiment previously described that separate fluid inlet ports 54 and 56 were provided to exert hydraulic pressure against the upper and lower compression bushings 42 and 44. In the embodiment shown in FIG. 12, the upper and lower housing members 12, 14, are provided with a drilled channel 130 which provides fluid communication between the upper and lower annular chambers within which the aforementioned compression bushings 42 and 44 are respectively located. In this case only a single fluid inlet port 132 is provided. By virtue of the interconnecting channel 130, the hydraulic pressure is equalized on the upper and lower halves of the resilient seal assembly 32. Uniform pressure on both sides of the seal assembly 32 helps to avoid seal misalignment. In the FIG. 12 embodiment a separate inlet port 76 for applying hydraulic fluid to the jacking assembly 60 is still required.

The embodiment of FIG. 13 takes the concept illustrated in FIG. 12 one step further wherein the hydraulic fluid for advancing the jacking piston 66 is also utilized to apply fluid pressure to the upper and lower compression bushings 42, 44. In order to achieve this, the previously described channel 130 interconnecting the upper and lower pressure chambers within which the upper and lower compression bushings 42, 44 are located, is provided with an extension 134 which provides communication between the upper and lower pressure chambers and the interior of the jacking cylinder 62. It should be noted, in the embodiment of FIG. 13, that the hydraulic fluid pressure which advances the piston 66 is only available to apply pressure to the upper and lower compression bushings 42, 44, after the piston and jacking ram have reached the full downward extent of the stroke.

FIG. 14 illustrates what may be described as a self-jacking arrangement which utilizes the process fluid pressure inside the pipe to provide the jacking force on the jacking ram and piston. In this embodiment, separate hydraulic fluid inlet ports 54 and 56 are provided as described previously; alternatively, the balanced configuration illustrated in FIG. 12 may be utilized. In order to provide self-jacking, a channel 136 or, alternatively, a suitable hydraulic line is provided to bring process fluid from the interior of the pipe into the interior of the jacking cylinder 62. The relatively greater surface area on top of the jacking piston 66 will cause the process fluid to automatically advance the piston and ram assembly together with the previously described sleeve 28 into the desired axial position. The arrangement shown in FIG. 14 can of course be used on both pressurized and unpressurized pipes. If there is no pressure inside the pipe, then no force is exerted upwardly against the underside of the hole saw 24 following cutting into the pipe and therefore no jacking force is required other than the usual force that would be applied during the course of the cutting operation by the operator. However, if there is pressure inside the pipe, such pressure will be communicated via the channel 136 to the jacking cylinder as soon as the hole saw has cut through the wall of the pipe.

Figure 15:
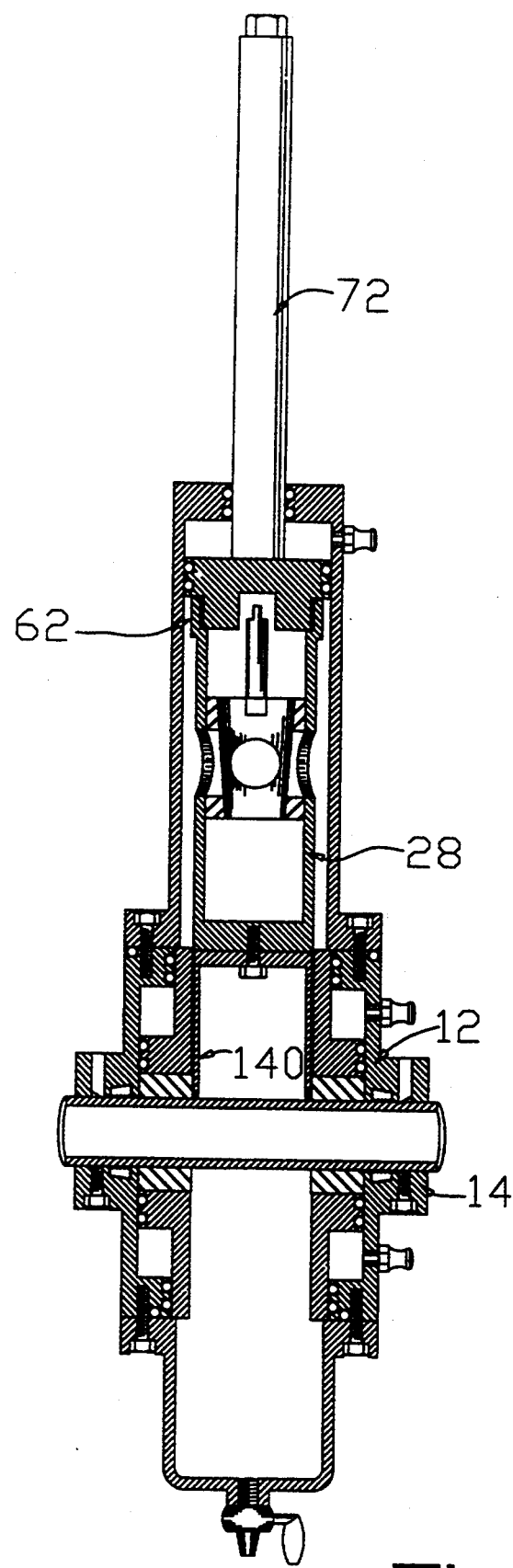
FIG. 15 is a cross-section view somewhat similar to that of FIG. 1 but showing an annular knife-cutter head (in place of the hole saw in FIG. 1) for use in cutting softer pipe materials such as plastics and copper.

A still further modification of the invention is illustrated in FIG. 15. Essentially this embodiment conforms to the embodiment of FIGS. 1, 2 etc. except that the hole saw 24 has been replaced with an annular knife cutter head 140. This would typically be utilized in low pressure applications where plastic or copper pipes, or other pipe materials of comparable hardness, are used. As noted previously, the use of the hole saw involves removing a thin rim of material from the pipe. The knife cutter head 140 is interchangeable with the hole saw.

The knife head has the advantage of not producing any cutting contamination and hence it does not require a flushing drain. It should be noted here that certain installations may require zero contamination owing to process purity or explosion considerations.

Figure 16:
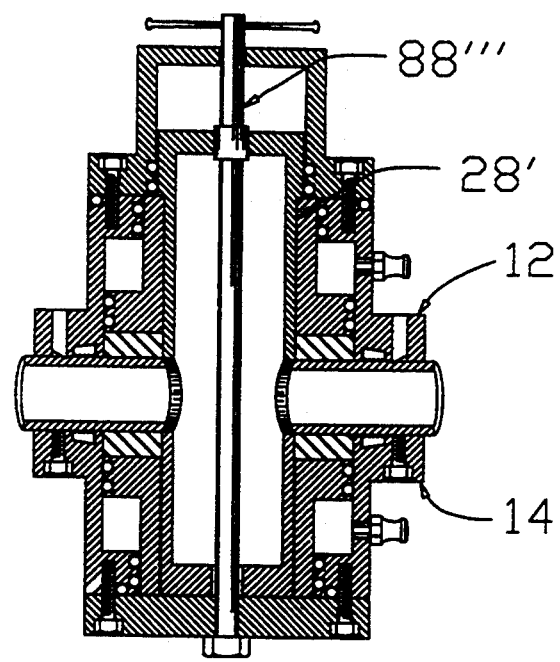
FIG. 16 is a cross-section of the installed valve assembly modified to provide a stationary rod wherein the sleeve acts as the valve by virtue of axial movement.

A further modification of the invention is illustrated in FIG. 16. This alternative embodies a threaded rod 88''' mounted in the top and bottom valve cover and extending along the secondary axis. A hollow sleeve 28' similar to that previously described incorporates a port along the primary axis which enables or disenables process fluid flow by sliding axially along the secondary axis or by rotating about the secondary axis. This is a simplified version of the apparatus previously described, without requiring valve internals.

Figure 17:
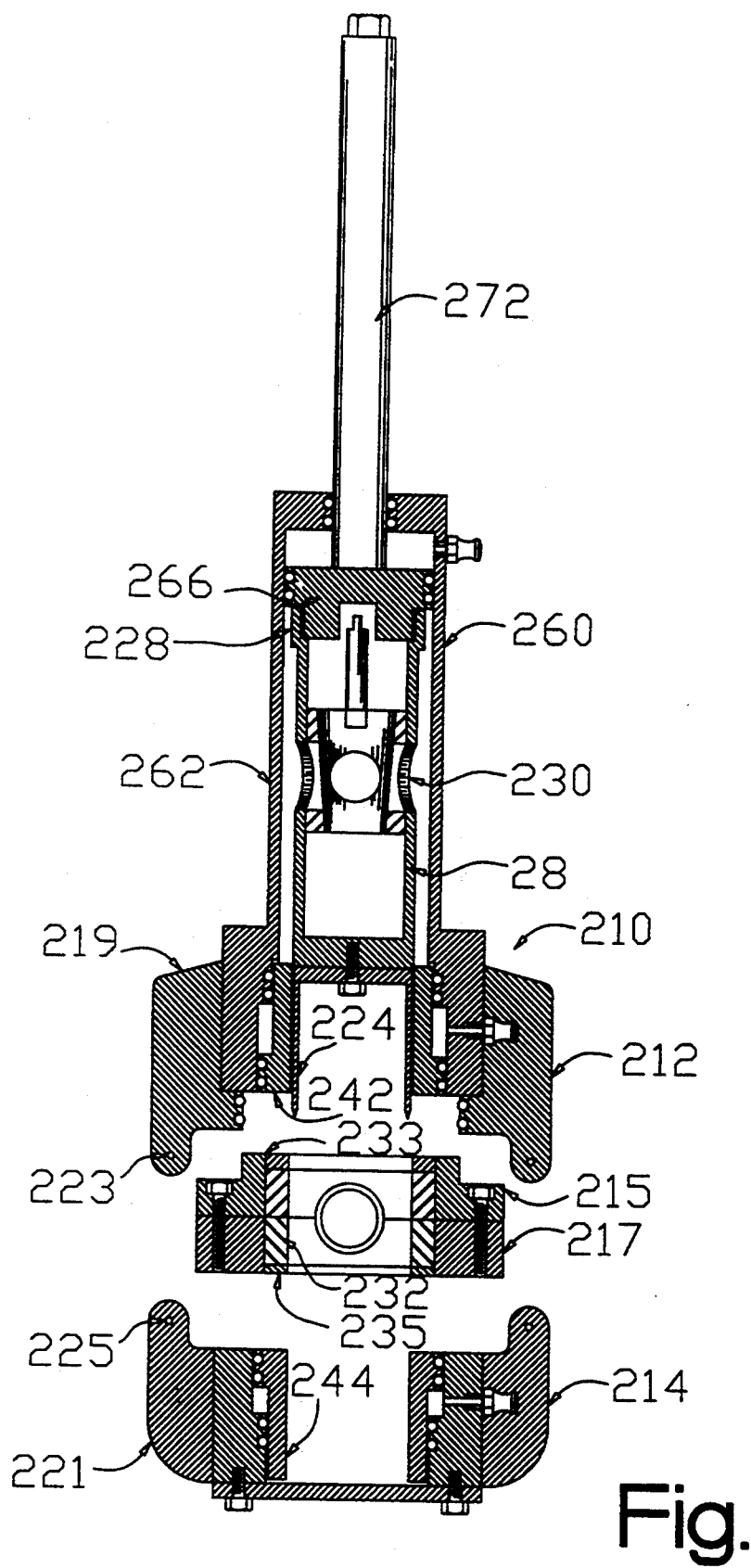
FIG. 17 is a vertical cross-section of a modified form of apparatus for installing a valve on an existing pipe wherein the upper and lower assemblies are readily attachable and detachable from each other.
Figure 18:
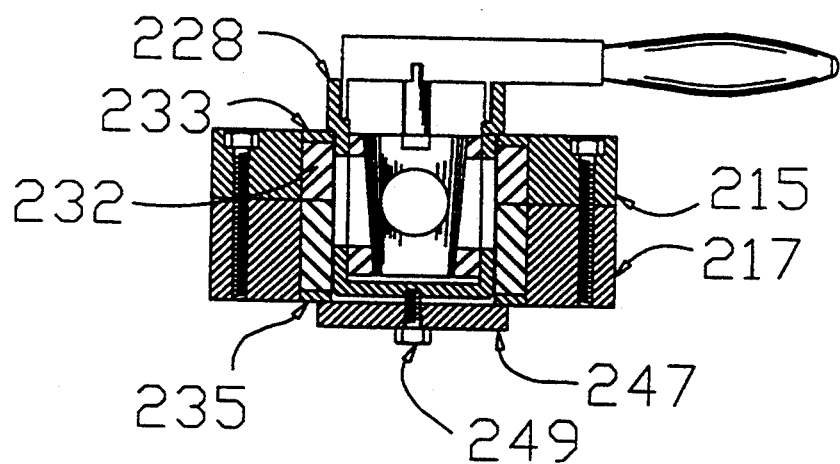
FIG. 18 is a cross-section view of the valve assembly which remains permanently on the pipe after completion of installation.

Important modifications of the invention are illustrated in FIGS. 17 and 18. The various embodiments described thus far incorporate many parts which are required for installation only but do not contribute to the permanent operation of the valve. Some of these parts include the annular compression bushings for the seal, the seal fluid inlet ports, and the seal O rings. These parts add bulk to the valve and are only used once during installation of a single valve.

The modified valve installation tool illustrated in FIG. 17 is designed to reduce bulk, make for quicker installation and to allow many parts to be reused for installation of other valves. Only those parts required to operate the permanent valve are included in the "permanent" valve housing.

Referring to FIG. 17, there is provided a main housing 210 including a first pair of separable housing members 212 and 214 adapted to be located on opposing sides of the pipe. A second pair of separable housing members 215 and 217 together define a first bore extending along a first axis for receiving a pipe and embracing the same. The second pair of housing members 215 and 217 are releasably securable together by suitable bolts (not shown) independently of the first pair of housing members 212, 214 so that the first pair of housing members can be removed while leaving the second pair of housing members 215 and 217 permanently secured together in embracing relation to the pipe. These second members 215, 217 also define a second bore extending along a second axis and intersecting the first axis in transverse relation to it.

The first pair of housing members 212, 214 are releasably securable together on opposing sides of the second pair of housing members 215, 217 thereby to firmly secure the entire assembly in place on the pipe. In order to achieve this, the first pair of housing members 212, 214, are provided with co-operating lugs 219,221 and when they are fitted together, suitable pins (not shown) are inserted in apertures 223, 225 thereby to firmly secure the first pair of housing members 212, 214 together in snug embracing relationship to the second pair of housing members 215, 217.

The second pair of members 215, 217 are provided with a seal assembly 232 which is essentially of the same configuration as the seal assembly 32 described previously. Hence it need not be described further. The lower housing member 214 is provided with a slidable seal compression bushing 244 while the upper housing member 212 is provided with a seal compression bushing 242. The upper housing member 212 is also provided with a jack assembly 260 including a ram 272, a piston 266, both of which slide within the jacking cylinder 262. The piston 266 engages with the upper end of a sleeve 228 essentially as described previously, sleeve 228 being provided with a through port 230 with any suitable valve being located within sleeve 228 essentially as described previously. The lower end of sleeve 228 is fitted with a hole saw 224 exactly as described previously.

It should also be noted here that the resilient seal assembly 232 is provided on its upper and lower surfaces with a circular seal cover plate 233, 235, these cover plates having central apertures sufficiently large as to accommodate the hole saw 224.

In use, the second pair of housing members 215, 217, which form the permanent-valve housing, together with the seal assembly 232 and cover plates 233, 235 are first clamped onto the outside of the existing pipe. The remainder of the assembly shown in FIG. 17 including the first pair of separable housing members 212, 214, together with their associated assemblies, e.g. jack assembly 260, which may be referred to as a valve installation tool, are then fitted together by virtue of the previously mentioned pins and thus become firmly clamped onto the outside of the permanent valve housing comprising the aforementioned housing members 215, 217. The remaining operations of jacking, drilling, compressing the seal assembly 232 and removing the hole saw 224 are identical to the operations as described previously. It might however be noted that the bottom seal compression bushing 244 is of larger inside diameter as compared with the first embodiment described so that the bottom cover 247 may be bolted to the sleeve bottom, as shown in FIG. 18, while maintaining adequate pressure against the seal assembly 232. The seal cover plates 233, 235 are urged toward each other thus compressing the seal assembly 232 therebetween, the axial forces to effect this being transmitted via the sleeve 228, the outwardly stepped upper end of which bears against the upper seal cover plate 233 while the bottom cover 247 bears against the bottom seal cover plate 235. Once this has been done and the seal assembly 232 has been adequately compressed as by tightening up of the threaded stud 249 (see FIG. 18 again), the aforementioned pins may be removed from apertures 223, 225 in lugs 219, 221 respectively, and the complete installation tool removed leaving only the permanent valve in place on the pipe as illustrated in FIG. 18. Although FIG. 18 shows the sleeve 228 as being fitted with a conventional style of tapered plug valve, numerous other types of valves may be fitted within the sleeve such as those illustrated previously in FIGS. 8A through 8J. The valve installation tool which has been removed may be reused time and time again on other installations.

Figure 19:
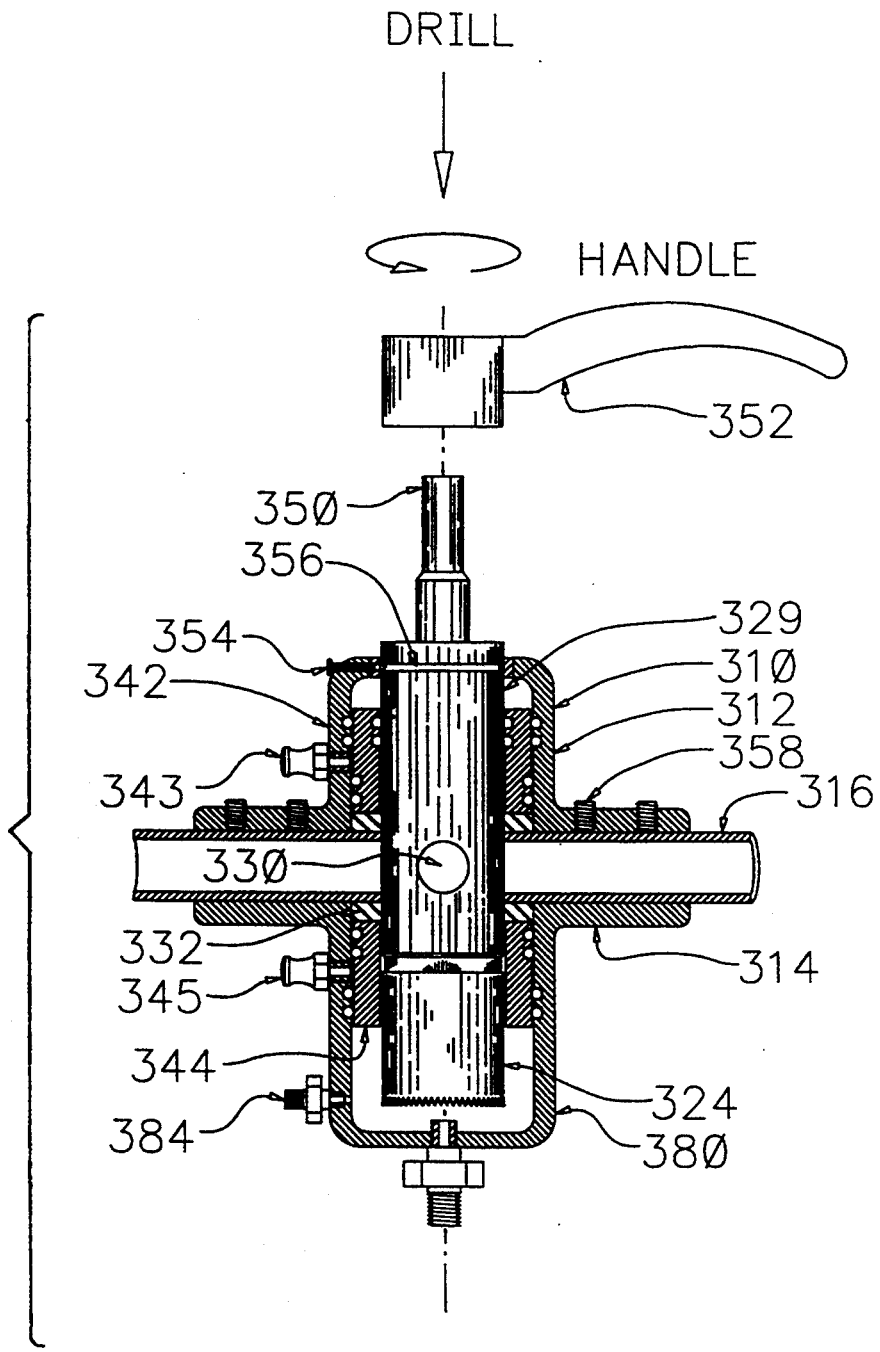
FIG. 19 is a cross-section view of a simple form of valve assembly incorporating a hole saw and wherein the valve is provided by a solid plug with a through hole.

The last embodiment shown is the simple cylindrical plug valve arrangement shown in FIG. 19. This arrangement includes a main housing 310 including separable upper and lower housing members 312,314 again defining a first bore for snugly receiving the pipe 316 and embracing the same. These housing members also define a second bore extending along a second axis and intersecting the first axis in transverse relation to it. An annular cutter or hole saw 324 is disposed in the second bore and is capable of being advanced along the second axis for cutting and removing a section of the pipe when located in housing 310. This hole saw 324 is affixed to a cylindrical plug 329 which is axially movable along with the hole saw 324 along the second bore with this cylindrical member 329 having a port 330 extending transversely through it. A split resilient seal assembly 332, very similar to that described previously in conjunction with FIG. 1 etc., is provided to effect a snug seal both around the ends of the cut pipe and around the cylindrical member 329. In addition, upper and lower seal bushings 342, 344 are provided which effect snug sealing engagement around the cylindrical member 329 thus preventing passage of fluids therealong. Seal nipples 343 and 345 allow for hydraulic fluid or some other suitable medium to be injected thereby to enhance the sealing action.

It should also be noted that the lower housing member 314 is provided with a lower chamber 380, the bottom of the latter being provided with a drain port 382 for releasing contamination etc. and inlet flushing port 384 for allowing flushing liquids to be injected in to the chamber.

The upper end of the cylindrical member is provided with an elongated stem 350 which can be engaged by a valve operating handle 352. Furthermore, in order to prevent axial movement of the cylindrical member 329 once the installation has been effected, the upper housing member 312 is provided with an elongated screw 354, the inner end of which rides in a circumferential groove 356 provided in the upper end of the cylindrical member 329. This allows free rotation of the cylindrical member via the operating handle 352 but prevents any significant amount of axial movement from taking place thus ensuring that the through port 330 is in line with the axis of pipe 316.

Suitable set screws 358 prevent axial blow out of the pipe 316 under the influence of internal pressures.

Since the embodiment of FIG. 19 does not employ any form of jacking system for advancing the hole saw 324 against the influence of pressures existing within pipe 316, it will be apparent that the FIG. 19 embodiment can be used only on very low pressure applications, or on applications where the pressure within the pipe is greatly reduced or eliminated during the installation procedure.

A preferred embodiment of the invention has been described by way of example. Those skilled in the art will realize that various modifications and changes may be made while remaining within the spirit and scope of the invention. Hence the invention is not to be limited to the embodiment as described but, rather, the invention encompasses the full range of equivalencies as defined by the appended claims.

We claim:

1. Apparatus for installing and/or replacing a valve on an existing pipe which may be under fluid pressure, comprising:
    a main housing including a pair of separable housing members together defining a first bore extending along a first axis for receiving the pipe and embracing the same;
    said housing members also defining a second bore extending along a second axis intersecting the first axis in transverse relation thereto;
    an annular cutter in said second bore and capable of being advanced along said second axis for cutting and removing a section of the pipe located within said main housing;
    a further member axially movable with said cutter along said second bore into a predetermined axial position adjacent the ends of said pipe after said pipe section has been removed by said cutter, said further member having a port means extending transversely therethrough causing flow through said pipe to be selectively enabled and disabled when said further member is selectively moved or positioned such as to bring said port means into and out of alignment with said first axis along which the pipe extends; and
    sealing means located within said main housing for forming a fluid tight seal between the pipe and each of said housing members when in use and around said further member when it is in said axial position for enabling and disabling flow through said pipe.

2. Apparatus according to claim 1 further including jacking means to assist in advancing said cutter and further member along said second bore against the pressure of fluid which may be in said pipe during the cutting thereof.

3. Apparatus according to claim 2 wherein said jacking means comprises a jacking cylinder attached to one of said housing members, a jacking piston within said cylinder and capable of bearing against said further member to urge same along said second bore when fluid pressure is introduced into the jacking cylinder.

4. Apparatus according to claim 3 including a jacking ram attached to said jacking piston and extending outwardly of the jacking cylinder so that rotation of said ram rotates said piston, means interengaging said piston and further member for rotation together whereby rotation of said ram effects rotation of the further member and the annular cutter to effect cutting of the pipe.

5. Apparatus according to claim 4 wherein said further member is in the form of a hollow sleeve, and a valve member located within said sleeve in fluid sealing relation therewith and in communication with said port and movable relative to said sleeve to control flow of fluid through said pipe when said sleeve is in said predetermined axial position with said port means in alignment with said pipe.

6. Apparatus as in claim 5 wherein said jacking cylinder is removable from said one housing member so that the jacking cylinder and jacking piston may be removed therefrom after said sleeve has been moved to said predetermined axial position within the second bore.

7. Apparatus as in claim 6 wherein said sealing means comprises a resilient seal body of substantially incompressible material with each of said housing members including a movable compression element mounted therein for movement along said second axis and being located on opposing sides of said resilient seal body such that movement of said compression elements toward each other serves to compress said resilient seal body into tight sealing relation with the pipe and the hollow sleeve.

8. Apparatus as in claim 7 wherein said compression elements each comprise an annular bushing slidably and sealingly engaged in respective annular chambers formed in said housing members, and means enabling fluid pressure to be applied to said annular chambers to cause the annular bushings to be urged toward each other to compress the resilient seal body.

9. Apparatus as in claim 8 further including a sub-housing secured to said main housing such as to receive therein said cutter and the section of pipe removed therefrom following completion of cutting and axial movement of the hollow sleeve to said predetermined axial position.

10. Apparatus as in claim 9 wherein said cutter is removably attached to said hollow sleeve and said sub-housing is removably attached to said main housing whereby both the sub-housing, cutter and cut pipe section may be removed from the main housing; and a cover member adapted to be secured to the main housing in place of said sub-housing and means to secure said hollow sleeve to said cover member to fix the predetermined axial position of the sleeve.

11. Apparatus as in claim 10 wherein said valve member has an operating stem thereon which projects outwardly of said one housing member to allow a valve operator to be connected to it after removal of the jacking cylinder from said one housing member, and wherein a further cover member is provided for securement to the main housing after said jacking cylinder is removed therefrom, said further cover member providing access to the operating stem of said valve member to permit actuation of the latter from outside the main housing.

12. Apparatus as in claim 11 wherein both of said cover members are further adapted to exert axial forces on said annular compression bushings when secured to said main housing whereby to maintain the resilient seal body under compression and in sealed engagement with the pipe and said hollow sleeve member.

13. Apparatus as in claim 1 including means interacting between said main housing and the pipe when in use to resist axial blow-out of the pipe after cutting thereof under the influence of pipe internal fluid pressures.

14. Apparatus as in claim 1 wherein said annular cutter comprises a toothed hole saw.

15. Apparatus as in claim 1 wherein said annular cutter comprises a sharp knife edge for use with softer pipe materials.

16. Apparatus as in claim 5 wherein said valve member comprises any one of: a plug valve, a ball valve, a butterfly valve, a plunger valve, a gate valve, a spool valve, a globe valve, a needle valve, a check valve, or a diaphragm valve.

17. Apparatus for installing a valve on an existing pipe under fluid pressure comprising:
a main housing including a first pair of separable housing members adapted to be located on opposing sides of the pipe;
a second pair of separable housing members together defining a first bore extending along a first axis for receiving the pipe and embracing the same;
said second pair of housing members being releasably securable together independently of said first pair of housing members so that the first pair of housing members can be removed while leaving the second pair of housing members secured together in embracing relation to the pipe;
said first pair of housing members being releasably securable together on opposing sides of said second pair of housing members to secure the former to the pipe when in use;
said second pair of housing members also defining a second bore extending along a second axis and intersecting the first axis in transverse relation thereto;
an annular cutter carried by one of said first pair of housing members and capable of being advanced along said second bore for cutting and removing a section of the pipe located between said second pair of housing members;
a further member axially movable with said cutter along said second bore into a predetermined axial position adjacent the ends of said pipe after said pipe section has been removed by said cutter, said further member having a port means extending transversely therethrough causing flow through said pipe to be selectively enabled and disabled when said further member is selectively moved or positioned such as to bring said port means into and out of alignment with said first axis along which the pipe extends; and
sealing means located within said second pair of separable housing members for forming a fluid tight seal between the pipe and each of said second pair of housing members when in use and around said further member when it is in said axial position for enabling and disabling flow through said pipe.

18. Apparatus according to claim 17 further including jacking means to assist in advancing said cutter and further member along said second bore against the pressure of fluid which may be in said pipe during the cutting thereof.

19. Apparatus according to claim 18 wherein said jacking means comprises a jacking cylinder attached to one of said first pair of housing members, a jacking piston within said cylinder and capable of bearing against said further member to urge same along said second bore when fluid pressure is introduced into the jacking cylinder.

20. Apparatus according to claim 19 including a jacking ram attached to said jacking piston and extending outwardly of the jacking cylinder so that rotation of said ram rotates said piston, means interengaging said piston and further member for rotation together whereby rotation of said ram effects rotation of the further member and the cutter to effect cutting of the pipe.

21. Apparatus according to claim 20 wherein said further member is in the form of a hollow sleeve arranged such that a valve member may be located within said sleeve in fluid sealing relation therewith and in communication with said port and movable relative to said sleeve to control flow of fluid through said pipe when said sleeve is in said predetermined axial position with said port means in alignment with said pipe.

22. Apparatus as in claim 21 wherein said sealing means comprises a resilient seal body of substantially incompressible material mounted in said second pair of housing members with each of said first pair of housing members having a movable compression element mounted therein for movement along said second axis and being located on opposing sides of said resilient seal body such that movement of said compression elements toward each other serves to compress said resilient seal body into tight sealing relation with the pipe and the hollow sleeve.

23. Apparatus as in claim 22 wherein said compression elements each comprise an annular bushing slidably and sealingly engaged in respective annular chambers formed in said first pair of housing members, and means enabling fluid pressure to be applied to said annular chambers to cause the annular bushings to be urged toward each other to compress the resilient seal body therebetween.

24. Apparatus as in claim 23 further including a chamber defined in the other one of said first pair of housing members such as to receive therein said cutter and the section of pipe removed therefrom following completion of cutting and axial movement of the hollow sleeve to said predetermined axial position.

25. Apparatus as in claim 24 wherein said cutter is removably attached to said hollow sleeve whereby the chamber, cutter and cut pipe section may be removed together with said other one of said first pair of housing members; and a cover member adapted to be secured to said hollow sleeve to fix the predetermined axial position of the sleeve within the second pair of housing members after the first pair of housing members have been removed.

26. Apparatus as in claim 25 wherein said cover member is further constructed to co-operate with said sleeve as to exert axial forces on said annular compression bushings whereby to maintain the resilient seal body under compression and in sealed engagement with the pipe and said hollow sleeve member.

27. Apparatus as in claim 17 including means interacting between said main housing and the pipe when in use to resist axial blow-out of the pipe after cutting thereof under the influence of pipe internal fluid pressures.

28. Apparatus as in claim 17 wherein said annular cutter comprises a toothed hole saw.

29. Apparatus as in claim 17 wherein said annular cutter comprises a sharp knife edge for use with softer pipe materials.

30. Apparatus for installing a valve on an existing pipe under fluid pressure comprising:
   a main housing including a first pair of separable housing members adapted to be located on opposing sides of the pipe;
   a second pair of separable housing members together defining a first bore extending along a first axis for receiving the pipe and embracing the same;
   said second pair of housing members being releasably securable together independently of said first pair of housing members so that the first pair of housing members can be removed while leaving the second pair of housing members secured together in embracing relation to the pipe;
   said first pair of housing members being releasably securable together on opposing sides of said second pair of housing members to secure the former to the pipe when in use;
   said second pair of housing members also defining a second bore extending along a second axis and intersecting the first axis in transverse relation thereto.

31. Apparatus according to claim 30 further comprising:
   an annular cutter carried by one of said first pair of housing members and capable of being advanced along said second bore for cutting and removing a section of the pipe located between said second pair of housing members;
   a further member axially movable with said cutter along said second bore into a predetermined axial position adjacent the ends of said pipe after said pipe section has been removed by said cutter, said further member having a port means extending transversely therethrough causing flow through said pipe to be selectively enabled and disabled when said further member is selectively moved in relation to said second axis such as to bring said port means into and out of alignment with said first axis along which the pipe extends.

32. Apparatus according to claim 31 including sealing means located within said second pair of separable housing members for forming a fluid tight seal between the pipe and each of said second pair of housing members when in use and around said further member when it is in said axial position for enabling and disabling flow through said pipe.

* * * * *